US009256477B2

(12) United States Patent
Truong et al.

(10) Patent No.: US 9,256,477 B2
(45) Date of Patent: Feb. 9, 2016

(54) LOCKLESS WATERFALL THREAD COMMUNICATION

(71) Applicant: NetApp, Inc., Sunnyvale, CA (US)

(72) Inventors: Dan Truong, Sunnyvale, CA (US); Alexander Sideropoulos, Sunnyvale, CA (US); Michael Cao, Sunnyvale, CA (US); Raymond Luk, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 42 days.

(21) Appl. No.: 14/290,763

(22) Filed: May 29, 2014

(65) Prior Publication Data
US 2015/0347196 A1      Dec. 3, 2015

(51) Int. Cl.
*G06F 9/46* (2006.01)
*G06F 9/52* (2006.01)
*G06F 9/48* (2006.01)
(Continued)

(52) U.S. Cl.
CPC .............. *G06F 9/524* (2013.01); *G06F 3/0619* (2013.01); *G06F 3/0665* (2013.01); *G06F 3/0689* (2013.01); *G06F 9/3009* (2013.01); *G06F 9/4881* (2013.01); *G06F 9/528* (2013.01)

(58) Field of Classification Search
CPC ... G06F 3/0619; G06F 3/0665; G06F 3/3689; G06F 9/524; G06F 9/528; G06F 9/3009; G06F 9/4881
USPC .......................................................... 718/107
See application file for complete search history.

(56) References Cited

U.S. PATENT DOCUMENTS 5,961,584 A * 10/1999 Wolf ...................... G06F 9/542
                                                                  718/100
6,542,921 B1 * 4/2003 Sager .................... G06F 9/4881
                                                                  712/228
(Continued)

FOREIGN PATENT DOCUMENTS

GB            2492653 A  *  1/2013  ................ G06F 9/52

OTHER PUBLICATIONS vanDooren, "Creating a Thread Safe Producer Consumer Queue in C++ Without Using Locks," C++ Programming on Cloud 9, Jan. 5, 2007, last retrieved from blogs.msmvps.com/ vandooren/2007/01/05/creating-a-thread-safe-producer-consumer-queue-in-c-without-using-locks/ on Sep. 3, 2015.*

(Continued)

*Primary Examiner* — Wei Zhen
*Assistant Examiner* — Andrew M Lyons
(74) *Attorney, Agent, or Firm* — Klein, O'Neill & Singh, LLP

(57) ABSTRACT

Systems and methods are disclosed for communicating state information of a session between a plurality of processing threads in a hierarchy. The session is passed down through the hierarchy, with one or more threads processing the session at each level of the hierarchy. An example method includes reading a first pointer of a first processing thread and comparing the first pointer to a second pointer of a second processing thread. The second processing thread is dependent on the first processing thread. The method also includes in response to determining that the first pointer does not match the second pointer, processing a set of configuration items in a session. The method further includes after processing the set of configuration items in the session, updating the second pointer of the second processing thread to match the first pointer of the first processing thread.

20 Claims, 11 Drawing Sheets

(51) Int. Cl.
  *G06F 9/30*       (2006.01)
  *G06F 3/06*       (2006.01)

(56) References Cited

U.S. PATENT DOCUMENTS

| | | | | |
|---|---|---|---|---|
| 8,127,303 | B2* | 2/2012 | Kukanov | G06F 9/526 707/800 |
| 8,185,895 | B2* | 5/2012 | Ko | G06F 9/461 711/154 |
| 8,196,147 | B1* | 6/2012 | Srinivasan | H04L 67/2842 711/118 |
| 8,234,250 | B1* | 7/2012 | Sharma | G06F 17/3015 707/649 |
| 8,245,207 | B1* | 8/2012 | English | G06F 8/456 712/203 |
| 8,621,184 | B1* | 12/2013 | Radhakrishnan | G06F 7/38 712/220 |
| 8,910,171 | B2* | 12/2014 | Mital | G06F 9/3851 718/102 |
| 8,954,986 | B2 | 2/2015 | Rajagopalan | G06F 9/4881 700/4 |
| 2002/0199069 | A1* | 12/2002 | Joseph | G06F 12/023 711/147 |
| 2003/0140085 | A1* | 7/2003 | Moir | G06F 9/52 718/107 |
| 2003/0233392 | A1* | 12/2003 | Forin | G06F 9/4881 718/107 |
| 2004/0154020 | A1* | 8/2004 | Chen | G06F 9/5027 718/107 |
| 2007/0169123 | A1* | 7/2007 | Hopkins | G06F 9/526 718/100 |
| 2008/0034190 | A1* | 2/2008 | Rodgers | G06F 9/3009 712/224 |
| 2008/0062927 | A1* | 3/2008 | Zhu | H04L 49/109 370/331 |
| 2010/0095305 | A1* | 4/2010 | Akizuki | G06F 9/3851 718/107 |
| 2011/0265098 | A1* | 10/2011 | Dozsa | G06F 9/546 719/314 |
| 2013/0191852 | A1* | 7/2013 | Howes | G06F 9/542 719/318 |
| 2013/0198760 | A1* | 8/2013 | Cuadra | G06F 9/445 718/106 |
| 2013/0305258 | A1* | 11/2013 | Durant | G06F 9/4881 718/106 |
| 2014/0068232 | A1* | 3/2014 | Wang | G06F 9/3851 712/225 |
| 2014/0229953 | A1* | 8/2014 | Sevastiyanov | G06F 9/4881 718/102 |
| 2014/0237474 | A1* | 8/2014 | Branton | G06F 9/4881 718/102 |
| 2015/0205646 | A1* | 7/2015 | Singh | G06F 9/526 718/106 |

OTHER PUBLICATIONS

Wikipedia, "Non-Blocking Algorithm", http://en.wikipedia.org/wiki/Non-blocking_algorithm, May 21, 2014, 5 pgs.
Wikipedia, "Timestamp-Based Concurrency Control", http://en.wikipedia.org/wiki/Timestamp-based_concurrency_control, May 21, 2014, 4 pgs.

\* cited by examiner

LOCKLESS WATERFALL THREAD COMMUNICATION

BACKGROUND

The present disclosure generally relates to computing devices, and more particularly to communicating state information between process threads.

An application may include data that is shared between a pool of threads. A given program may have tens, hundreds, or thousands of threads, some of which may operate simultaneously as appropriate. A process may have its own private virtual address space and run one or more threads within that virtual address space. As noted above, some of the threads in a process may share data.

Before accessing shared data, a thread may lock the shared data so that another thread cannot modify the shared data while it is being accessed, to ensure coherency of the data being accessed. It may be desirable, however, to avoid the use of locks for a variety of reasons. To ensure that data accesses are thread safe, a variable may be locked before it is updated. In such a scenario, the lock may be abused by programmers and a higher risk of multiple threads and more complex interactions between the multiple threads may occur, resulting in possible performance loss. The use of locks may provide for complex interactions between threads as well as overhead. It is known that multi-threaded programming and lock management is a major complexity requiring skilled programmers to implement properly, and efficiently. As code ages and goes through maintenance from different engineers, who have varying degrees of expertise on a code block, and who are required to minimize lines of codes (LOC) modified, the use of the locks may become too conservative, trading code performance for safety and lines of code changed.

Additionally, a single concurrency program may manifest itself in many different ways such as deadlocks, live locks, or plain crashes. A deadlock occurs when two threads are sleeping, both waiting for the other to finish using a resource that each of them needs, and the two threads never wake up. A live lock is similar, but involves active processing from the threads. Moreover, performance issues commonly arise from using synchronization. A lock is a bottleneck, as it introduces a critical section that can only be accessed by one thread at a time. The more threads trying to get at a critical section, the more contention will arise as threads have to wait for their turn. Additionally, critical sections may grow and prevent scaling the code implementations. If a lock is badly placed or covers too wide a section in the interest of easier debugging (or just because of general laziness) performance penalties may occur. In complex systems, with many levels of locks, a lock ordering mechanism can be implemented, and its use may prevent deadlocks but may also increase the complexity of implementing access to data.

The purposes of locking data are to enforce coherency and preserve order in conflicting operations. Locking data, however, generates locking overhead. For example, to lock and unlock shared data, a few hundred instructions may need to be executed each time. To eliminate or minimize the disadvantages of locking data, nonlocking-based schemes exist that enforce coherency and preserve order in conflicting operations. For example, a traditional nonlocking technique uses a timestamp approach for serializing the execution of concurrent transactions. In time stamping, the execution order of concurrent transactions is defined before they begin their execution. The execution order is established by associating a unique timestamp (e.g., an integer) to every transaction. When two transactions conflict over data, their timestamps are used to enforce serialization by rolling back one of the conflicting transactions.

Avoiding the use of data locks between threads may eliminate the risk of deadlocks and synchronization delays. Moreover, a lockless approach may also prevent lazy programming that relies on coarse locks to enforce coherency, which may eventually create a hidden scalability issue. Thus, specific approaches avoiding locks are desirable for many applications.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
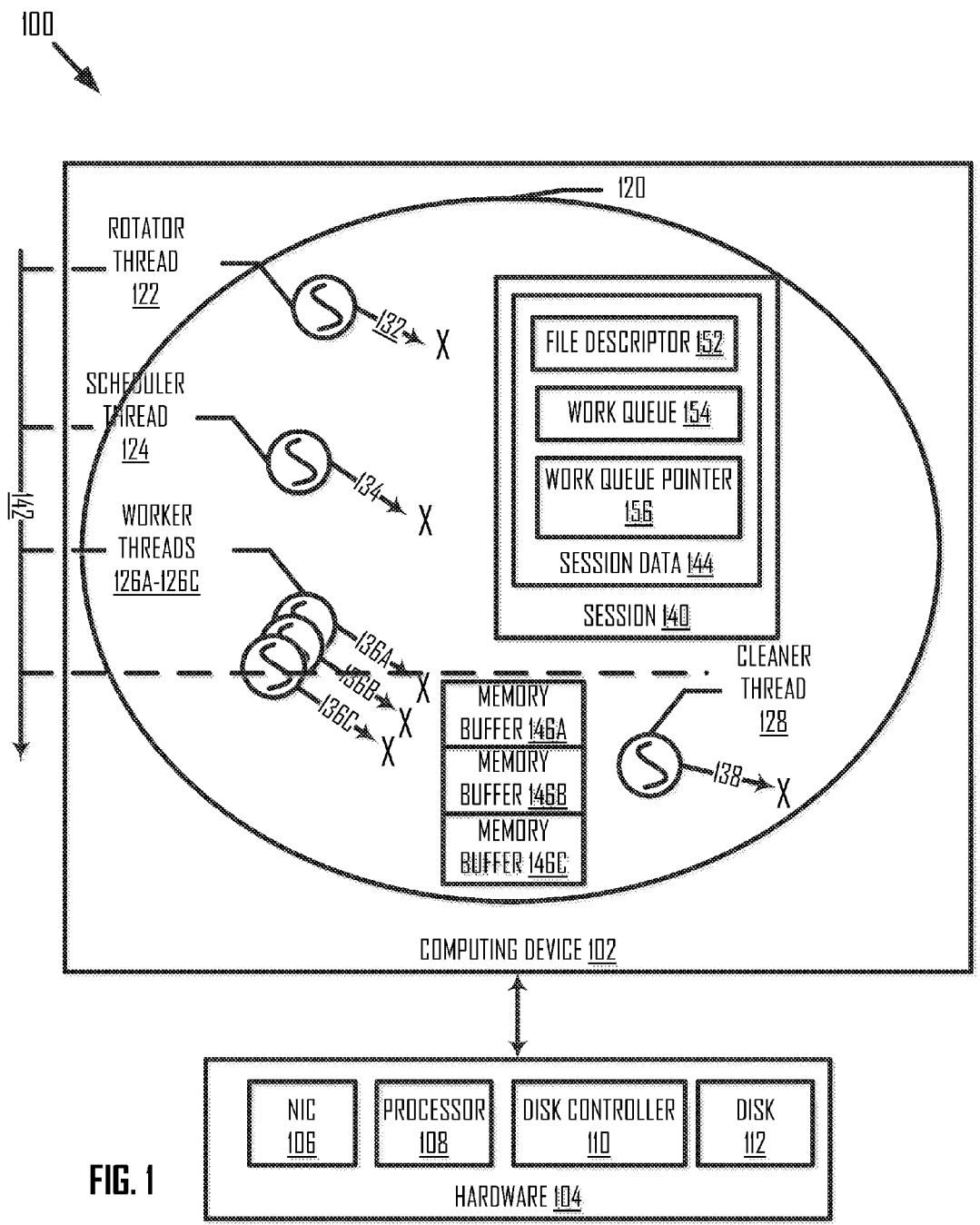
FIG. 1 is a block diagram illustrating a system for communicating session state information between a plurality of processing threads, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
III. Example Methods
   A. Create the Session and Process Session Data in the Session
   B. Consumer Thread Obtains the Session and Processes Session Data in the Session C. Worker Thread Processes Work Items Placed in the Work Queue
D. Cleaner Thread Writes the Data Stored in a Memory Buffer to Disk
IV. Exception Handling
A. Performance Variations
B. Multiple Threads Executing at a Layer of the Pipeline
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to communicate state information between a plurality of threads without locking session data in a session with the use of pointers. A session may be processed by multiple threads in accordance with an order. The present disclosure uses a lockless producer-consumer approach and provides a lockless thread communication methodology that enables a pipeline of threads to transfer data representing a session of work via the use of pointers that are managed by the threads.

The pipeline arrangement of threads may be referred to as a "waterfall" in the examples below. The threads may be thought of as "stateless" because they wake up and view the state of the thread's pointer above them in the waterfall and perform actions based on the pointer's value. For example, a consumer thread may be below a producer thread in the waterfall (the hierarchy will be explained in further detail below) and track the state of the pointer managed by the producer thread. In such an example, the consumer thread reads the producer thread's pointer and performs actions based on its value. The producer thread and consumer thread may agree about the state of the session before it is published by the producer thread and used by the consumer thread. Such agreement is referred to in the examples below as a "contract." Techniques provided in the present disclosure enable threads to manipulate session data in the session without locking the session data with the use of pointers. The consumer thread may determine the state of a session by reading the producer thread's pointer rather than by using locks on data in the session or other mechanism.

A producer thread and a consumer thread may each manage a pointer that is initialized to reference a particular value. The producer thread may process a session by processing a first set of configuration items in the session. After the producer thread is finished processing the first set of configuration items, the producer thread may publish the session. The producer thread may publish the session by updating the producer thread's pointer to reference the session. Thus, the memory address that the producer thread's pointer references has changed from referencing the initial value to referencing the session. Thus, a change in the producer thread's pointer may represent a transition in the session state information.

To properly process the session, the consumer thread may depend on the first set of configuration items being processed by the producer thread before the consumer thread starts to process the session. To ensure that the session is ready to be processed by the consumer thread, the consumer thread may read the producer thread's pointer and determine whether the producer thread's pointer matches the consumer thread's pointer. In response to determining that the producer thread's pointer matches the consumer thread's pointer, the consumer thread may use the session without further synchronization, because no transition has occurred in the session state information. In an example, the producer thread's pointer may match the consumer thread's pointer if both pointers reference their initialized values. In another example, the producer thread's pointer may match the consumer thread's pointer if both pointers reference the same session. In such an example, both the producer thread and consumer thread may have processed and published the session. They are free to use the session as long as they respect their contracts. A thread may read a field published as part of the contract. In an example, one of the threads writes a field and other threads read the field. The field may be "volatile" so the consumer threads notice the producer thread has updated it. If multiple threads write a field, proper synchronization is enforced for that field between the threads. In an example, the field may be guarded by a lock or it may be another lockless synchronization, for example, using a volatile field.

In response to determining that the producer thread's pointer does not match the consumer thread's pointer, the consumer thread processes a set of configuration items in the session. If the producer thread's pointer references a value that is different from the producer thread's initialized value, then the producer thread has published a session that is ready to be consumed and processed by the consumer thread. After processing the set of configuration items in the session, the consumer thread updates its pointer to match the producer thread's pointer.

II. Example System Architecture

FIG. 1 is a block diagram 100 illustrating a system for communicating session state information between a plurality of processing threads, according to an embodiment. Diagram 100 includes a computing device 102 coupled to hardware 104. Hardware 104 includes one or more network interface cards (NICs) 106, one or more processors 108, one or more disk controllers 110, and one or more storage devices such as a hard disk 112. Hardware 104 may also include other hardware devices or different hardware devices than that shown in FIG. 1. The principles described below may be applied to any of a variety of computing systems. For instance, in one embodiment computing device 102 includes a server running an operating system (OS), such as the LINUX OS or BSD (Berkeley Software Design) OS. In another embodiment, computing device 102 includes a network storage controller, which implements virtual storage on a multitude of physical storage drives and runs a storage operating system, such as the DATAONTAP OS, available from NetApp, Inc.

Computing device 102 may execute a process. A process is an instance of an executing program and may be defined by an operating system (OS) kernel (not shown) executing on computing device 102. System resources are allocated to a process in order to execute a program. From the kernel's point of view, a process may include user-space memory containing program code and variables used by that code, and a range of kernel data structures that maintain information about the state of the process. The information recorded in the kernel data structures may include various identifier numbers (IDs) associated with the process, a table of open file descriptors, information relating to signal delivery and handling, process resource usages and limits, the current working directory, and other information.

In the example illustrated in FIG. 1, computing device 102 executes a multi-threaded activity. The activity is referenced herein as process 120, but can be run within a user space process or program, or as a logical component inside the kernel itself using kernel threads and kernel memory, with a variable degree of interaction with other components of the OS. Multi-threaded process 120 includes a plurality of processing threads. Multi-threading is a mechanism that permits the operating system or applications to perform multiple tasks concurrently. The plurality of processing threads includes actions performed by one or more computer processors while executing computer code. A processing thread may also be referred to as a thread.

In FIG. 1, multi-threaded process 120 includes a plurality of threads including a rotator thread 122, a scheduler thread 124, one or more worker threads 126A-126C, and a cleaner thread 128. Each of rotator thread 122, scheduler thread 124, worker threads 126A-126C, and cleaner thread 128 may execute in multi-threaded process 120 and may share the same global memory, including initialized data, uninitialized data, and heap segments. Although six threads are illustrated as executing in multi-threaded process 120, this is not intended to be limiting and fewer or more than six threads may execute in multi-threaded process 120.

Session 140 includes session data 144 and may be processed by the plurality of threads in multi-processor 120. Other threads aside from those described in the present disclosure may execute in multi-threaded process 120 that do not perform work on session 140. A session 140 may be implemented using a data structure (e.g., a struct in the C programming language or a class in the C++ or JAVA® programming languages, etc.). Trademarks are the property of their respective owners. Session data 144 may include one or more fields. In an example, session 140 is implemented using a struct in the C programming language, and fields in session data 144 are properties of the struct that may be read and modified. Session data 144 includes a file descriptor 152, work queue 154, and work queue pointer 156, which will be discussed in further detail below.

Session 140 contains state information that is pertinent to the session and independent from another session. The state of a session is passed between threads. State information may include the state of all variables such as the values of fields in session 140. The fields may contain information needed by the tasks that the different threads perform. Multiple threads may access shared data in session 140, and a thread that updates shared data accessible to multiple threads typically locks the data before updating it. Although a data lock ensures that the shared data is safe from manipulation by other threads or ensures that another thread will read the most up-to-date data, a data lock causes overhead for each access to the shared data.

The present disclosure provides a communication methodology to communicate session state information between a plurality of processing threads using a lockless producer-consumer approach. The communication methodology may enforce the use of a "pipeline" or a hierarchy of threads to represent a session of work, referenced herein as a "waterfall." In an example, an "order of operations" based on a hierarchy 142 is enforced on a session such that a first thread at the top of hierarchy 142 performs a first set of actions on the session before a second thread that is below the first thread performs a second set of actions on the session. In FIG. 1, rotator thread 122 is at a top of hierarchy 142, scheduler thread 124 is one level below rotator thread 122, worker threads 126A-126C are one level below scheduler thread 124, and cleaner thread 128 is one level below worker threads 126A-126C. Although hierarchy 142 is described as having four levels, this is not intended to be limiting and hierarchy 142 may include two or more levels.

The plurality of threads in multi-threaded process 120 may process session data 144 in session 140 in accordance with hierarchy 142. State information in a session may be passed between processing threads and the processing threads can manipulate data without locking data in the session. In an example, a plurality of threads may be launched, and each of the plurality of threads may manage a pointer that is visible to one or more other threads. Session state information may be passed with the use of pointers. The pointers may be used as a mechanism to synchronize data between threads and it may be unnecessary to lock the data in session 140. For example, a thread may read the pointer of another thread to determine a state of the session. By passing the state information in the context of pointers managed by threads, the use of locks may be avoided. A thread's pointer may refer to the pointer that is managed by the thread and modifiable by the thread.

A thread that is at a level below a higher thread in the hierarchy may be thought of as a consumer of the higher thread. Similarly, the higher thread may be thought of as a producer thread that processes and produces data in session 140. The consumer thread may be dependent on the producer thread because the consumer thread consumes data that is produced by the producer thread. In an example, session data 144 includes a set of configuration items, and the producer thread processes the set of configuration items that is eventually consumed by the consumer thread. The set of configuration items may span one or more fields in session data 144. In processing session data 144 (e.g., the set of configuration items), the producer thread may modify one or more fields in session data 144 (e.g., file descriptor 152, work queue 154, or work queue pointer 156) upon which the consumer thread is dependent upon.

The producer and consumer threads may be bound to a contract in which the producer thread agrees to process a particular set of configuration items in the session before the producer thread publishes the session. A set of configuration items in a session may refer to the work items that need to be processed by the producer thread in order for the session to be useable by a consumer thread such that the consumer thread can perform its work on the session. Under the contract, the producer thread agrees to not change any of the data that the consumer thread needs to be immutable. The producer thread publishes a session when it is safe for a thread below the producer thread to consume the session. If the producer thread does not process the particular set of configuration items on which the consumer thread depends before publishing the session, the consumer thread may consume invalid data or corrupt data.

Publishing a session is a contract that eliminates contention between threads when making use of the data in session 140. The producer thread abides by the contract agreement with the consumer thread such that before the producer thread publishes the session, the producer thread has finished processing the set of configuration items on which the consumer thread depends. After the producer thread publishes the session, a consumer thread may then process session data 144 in session 140 and may complete its own tasks. Additionally, after the producer thread publishes the session, the producer thread may continue to perform some work on the session that the consumer thread does not depend on, or which has separate synchronization contracts. For example, session data 144 may include other fields that are consumed by consumer thread and producer thread may modify these fields.

The pointers managed by the plurality of threads may be initialized to reference a particular value. In an example, the pointers managed by the plurality of threads are initialized to reference a common value. In the example illustrated in FIG. 1, the common value is a null value, which is represented by an "X". Rotator thread 122 manages a pointer 132 that is initialized to reference a null value, scheduler thread 124 manages a pointer 134 that is initialized to reference a null value, worker thread 126A manages a pointer 136A that is initialized to reference a null value, worker thread 126B manages a pointer 136B that is initialized to reference a null value, worker thread 126C manages a pointer 136C that is initialized to reference a null value, and cleaner thread 128 manages a pointer 138 that is initialized to reference a null value.

Additionally, each worker thread may be designated a memory buffer. For example, worker thread 126A may be designated memory buffer 146A, worker thread 126B may be designated memory buffer 146B, and worker thread 126C may be designated memory buffer 146C. Each worker thread may manage its own memory buffer and may write data to its designated memory buffer. A memory buffer may be a global variable or may be in the session.

The pointers managed by the threads may be manipulated such that the data structure that represents a session is stored in only one place in memory. The communication of session state information between a plurality of processing threads is described in relation to global pointers that are visible to threads in a process. As discussed, each thread may manage a pointer and publish one or more sessions. A thread is independent of a session and consumes and processes session data in one or more sessions. A producer thread may publish a session by updating the producer thread's pointer to reference the session, thus providing an indication that a state of the session has been updated and the session is ready for consumption by the next one or more consumer threads after the producer thread in hierarchy 142.

When a pointer references a session, the pointer references a particular memory address associated with the session. In an example, the pointer may reference the starting memory address of the session. After the producer thread updates its pointer to reference session 140, the consumer thread may recognize that the producer thread's pointer has changed and use this as an indication that the set of configuration items in session data 144 upon which consumer thread depends has been processed. As such, session 140 is ready for the consumer thread to process the updated session data 144. In this way, a producer thread may use its pointer to communicate state information of a session to a consumer thread.

Each thread in multi-threaded process 120 may manage a global pointer that is visible to one or more of the other threads in multi-threaded process 120. Each thread may expose a global pointer that is shared with another thread and can be read by the other thread. A producer thread may manage a shared pointer that is shared with the consumer threads below it in hierarchy 142. For example, rotator thread 122's pointer 132 may be managed by rotator thread 122 and shared between rotator thread 122 and scheduler thread 124 such that scheduler thread 124 is able to read pointer 132. Similarly, scheduler thread 124's pointer 134 may be managed by scheduler thread 124 and shared between scheduler thread 124 and worker threads 126A-126C such that worker threads 126A-126C are able to read pointer 134. Similarly, a worker thread's pointer may be managed by the worker thread and shared between the worker thread and cleaner thread 128 such that cleaner thread 128 is able to read the worker thread's pointer. Lastly it is possible of any other relationship. For example, the scheduler thread 124 may spy on the state of the cleaner session pointer 138.

Hierarchy 142 may be thought of as a "waterfall" that indicates how a session will be passed down through the threads. The threads may be thought of as "stateless" because they wake up and view the state of the thread above them in the waterfall, via the pointers. A consumer thread performs actions based on its shared pointer with the producer thread and tracks the state of the shared pointer. Additionally, a consumer thread may manage a shared pointer that is shared with the one or more threads above it in hierarchy 142. For example, scheduler thread 124's pointer 134 may be managed by scheduler thread 124 and shared between rotator thread 122 and scheduler thread 124 such that rotator thread 122 is able to read pointer 134. Similarly, worker thread 126A's pointer may be managed by worker thread 126A and shared between rotator thread 122, scheduler thread 124, and worker thread 126A such that rotator thread 122 and scheduler thread 124 are able to read pointer 136A. Similarly, cleaner thread 128's pointer may be managed by cleaner thread 128 and shared between rotator thread 122, scheduler thread 124, worker threads 126A-126C, and cleaner thread 128 such that rotator thread 122, scheduler thread 124, and worker threads 126A-126C are able to read pointer 138.

Embodiments of the invention may make it unnecessary to lock shared fields in the session to enforce coherency as the data from previous threads in the waterfall is guaranteed to be set when the session becomes accessible. A thread may modify a field without locking the field as only one thread is allowed to modify the field, independent of the number of consumers of the field. The use of the waterfall approach may enable the spawning of more threads for processing the session at one level in order to parallelize the work on the session as will be discussed in further detail below. Additionally, the use of the waterfall approach may enable the scheduling and throttling of activities by programming wake-up times for the threads.

In an embodiment, the pointer is a volatile pointer. A volatile pointer is a pointer for which the compiler is not allowed to optimize the memory accesses, because it can be modified asynchronously by other threads/processes. In an example, a volatile pointer may be implemented in the C or C++ programming language by using the keyword "volatile" (e.g., volatile foo *bar=0). A change to the volatile pointer managed by a thread is visible to the other threads in multi-threaded process 120. A consumer thread down the waterfall may poll the pointer of the producer thread above the consumer thread and notice that a session has been published and is safe for consumption. The use of the waterfall methodology may aid in designing a software pipeline having multiple threads in flight and each handling a portion of the processing. The throttling of thread activity may be inherent to the design, with the rhythm of processing being set by the production of pointers. A producer thread can further signal consumer thread(s) so they detect the availability of a new session pointer before the polling cycle repeats or in lieu of polling.

III. Example Methods

Figure 2:
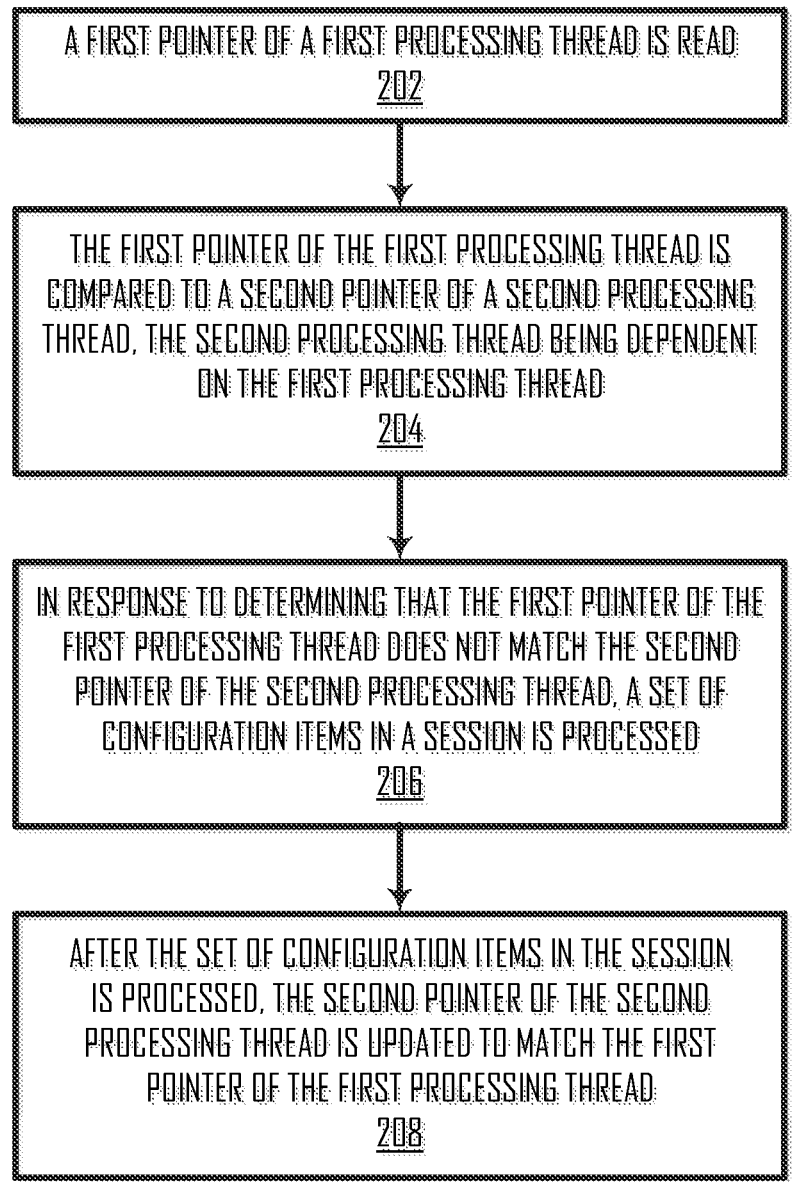
FIG. 2 is a flowchart illustrating a method of communicating state information of a session between a plurality of processing threads, according to an embodiment.

FIG. 2 is a flowchart illustrating a method 200 of communicating state information of a session between a plurality of processing threads, according to an embodiment. Method 200 is not meant to be limiting and may be used in other applications.

Method 200 includes blocks 202-208. In a block 202, a first pointer of a first processing thread is read. Blocks 202-208 may be implemented via a second processing thread. In an example, the first processing thread is rotator thread 122 and scheduler thread 124 reads rotator thread 122's pointer. In such an example, scheduler thread 124 may be a consumer thread that wakes up and reads rotator thread 122's volatile pointer.

In a block 204, the first pointer of the first processing thread is compared to a second pointer of a second processing thread, the second processing thread being dependent on the first processing thread. In an example, scheduler thread 124 compares rotator thread 122's volatile pointer to scheduler thread 124's volatile pointer. If rotator thread 122's volatile pointer matches scheduler thread 124's volatile pointer, either the pointers both reference a null value or both reference a common session. If rotator thread 122's volatile pointer does not match scheduler thread 124's volatile pointer, a transition has occurred and rotator thread 122 has updated its pointer to reference a session. As such, rotator thread 122 has processed a first set of configuration items in session data 144, and session 140 is ready for scheduler thread 124 to consume session 140.

In a block 206, in response to determining that the first pointer of the first processing thread does not match the second pointer of the second processing thread, a set of configuration items in a session is processed. The set of configuration items may be relied upon by one or more threads at a level lower than the second processing thread in the hierarchy. In an example, the second processing thread (e.g., consumer thread) may depend on the first processing thread (e.g., producer thread) processing a first set of configuration items in session data 144 before the second processing thread starts to process session 140. In response to determining that rotator thread 122's volatile pointer does not match scheduler thread 124's volatile pointer, scheduler thread 124 processes a second set of configuration items in session 140. The second set of configuration items may be different from the first set of configuration items.

In a block 208, after the set of configuration items in the session is processed, the second pointer of the second processing thread is updated to match the first pointer of the first processing thread. In an example, after scheduler thread 124 processes the second set of configuration items in session 140, scheduler thread 124 updates pointer 134 to match pointer 124, which references session 140. Accordingly, rotator thread 122's pointer and scheduler thread 124's pointer will reference session 140.

It is understood that additional processing may be performed before, during, or after blocks 202-208 discussed above. It is also understood that one or more of the blocks of method 200 described herein may be omitted, combined, or performed in a different sequence as desired. The passing of the session state information via the use of pointers may continue until the last thread in the hierarchy processes session data 140. Accordingly, one or more consumer thread may implement blocks 202-208.

The following description may describe each of the threads as being responsible for performing particular actions, but this is merely an example and threads may be responsible for performing other actions different from those described. In an example, process 120 is the operating system (OS) kernel executing in computing device 102, and it generates archive files including performance data of subsystems. The OS kernel may desire to collect information over time about different subsystems associated with computing device 102.

A session relates to all the data needed to configure and track an archive file that is created, updated, and closed. The archive file stores all of the performance statistics from multiple components executing on a node. Referring back to FIG. 1, examples of subsystems are NIC 106, processor 108, volume 110, and disk 112. A subsystem may run and accrue values and counters that may be monitored to determine the performance of the subsystem. An archive file is a file that is to be stored on disk and may contain performance data of one or more subsystems during a period of time. In an example, thousands of performance metrics are collected from the subsystems every second (e.g., NIC 106, processor 108, disk controller 110, and hard disk 112) and stored in the archive file spanning 15 minutes intervals.

The plurality of processing threads in multi-threaded process 120 may create an archive file, collect performance metrics and information from different subsystems, and store the performance data in the archive file, with a processing thread at each layer of the waterfall performing some work on session 140 pertaining to the archive file. The information stored in the archive file may represent a history of the performance of subsystems in order to analyze them. Thus if a problem occurs, subsystem performance counters may be analyzed to diagnose the problem. In an example, worker threads 126A-126C may perform work on session 140 in order to collect performance metrics and then pass the session to cleaner thread 128 to write the performance data to disk 112. Sessions may be shared among the plurality of processing threads, and session data may be processed without locking session data in the session.

Although the description may describe the threads executing in multi-threaded process 120 in the context of an archive file and the collection of performance data, this is not intended to be limiting. Rather, the archive file and collection of performance data are used as an example use case that may benefit from the teachings in the present disclosure.

A. Create the Session and Process Session Data in the Session

In FIG. 1, rotator thread 122's pointer, scheduler thread 124's pointer, worker thread 126A-126C's pointers, and cleaner thread 128's pointer reference a null value. Rotator thread 122 may be a producer thread for the scheduler thread 124 in hierarchy 142, which processes session data 144 in session 140. In such an embodiment, the rotator thread 122 creates the archive file, initializes it and updates the session data 144 before updating the rotator thread session pointer 132. The scheduler thread 124 detects the new session, clears the work queues, and publishes it for the worker threads to use by updating the scheduler session pointer 134. Scheduler thread 124 then proceeds to update the work queues repeatedly so worker threads can perform the work, until a new session is published in the rotator thread pointer 132.

Figure 3:
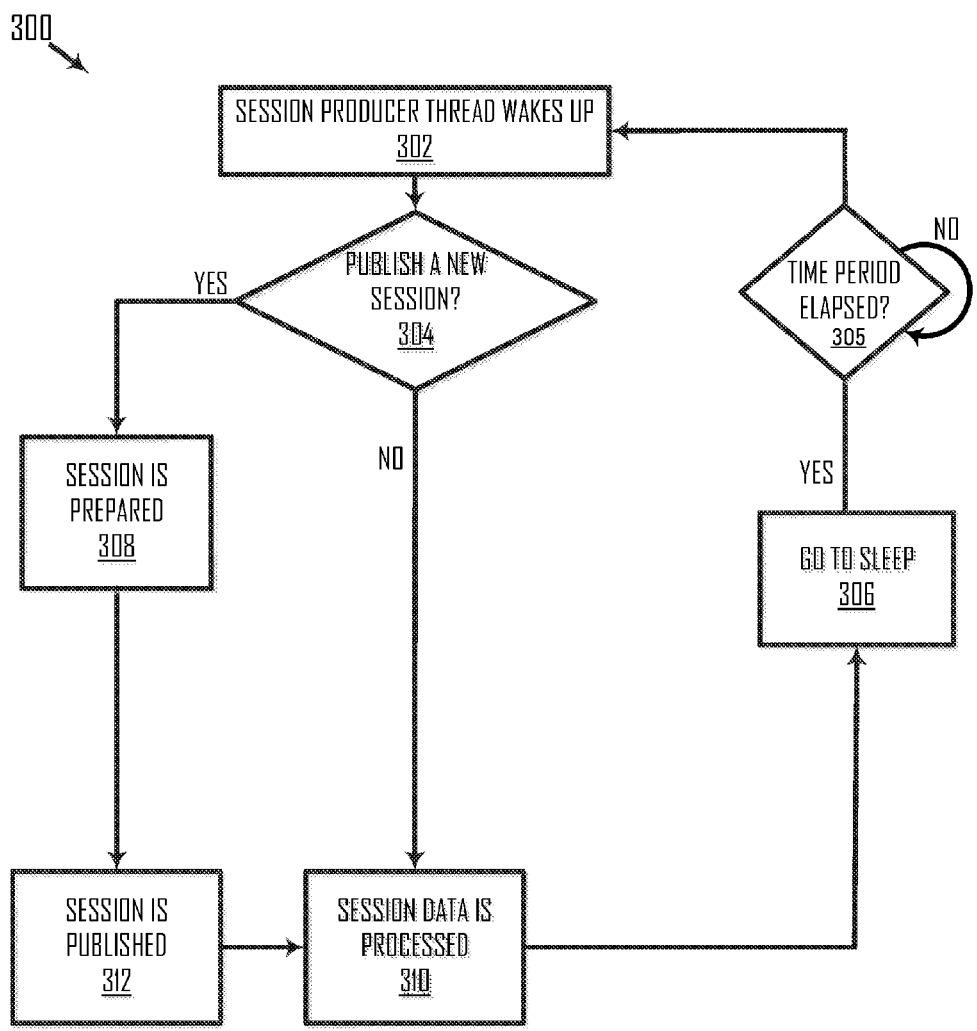
FIG. 3 is a flowchart illustrating a method of a session producer thread processing a session, according to an embodiment.
Figure 4:
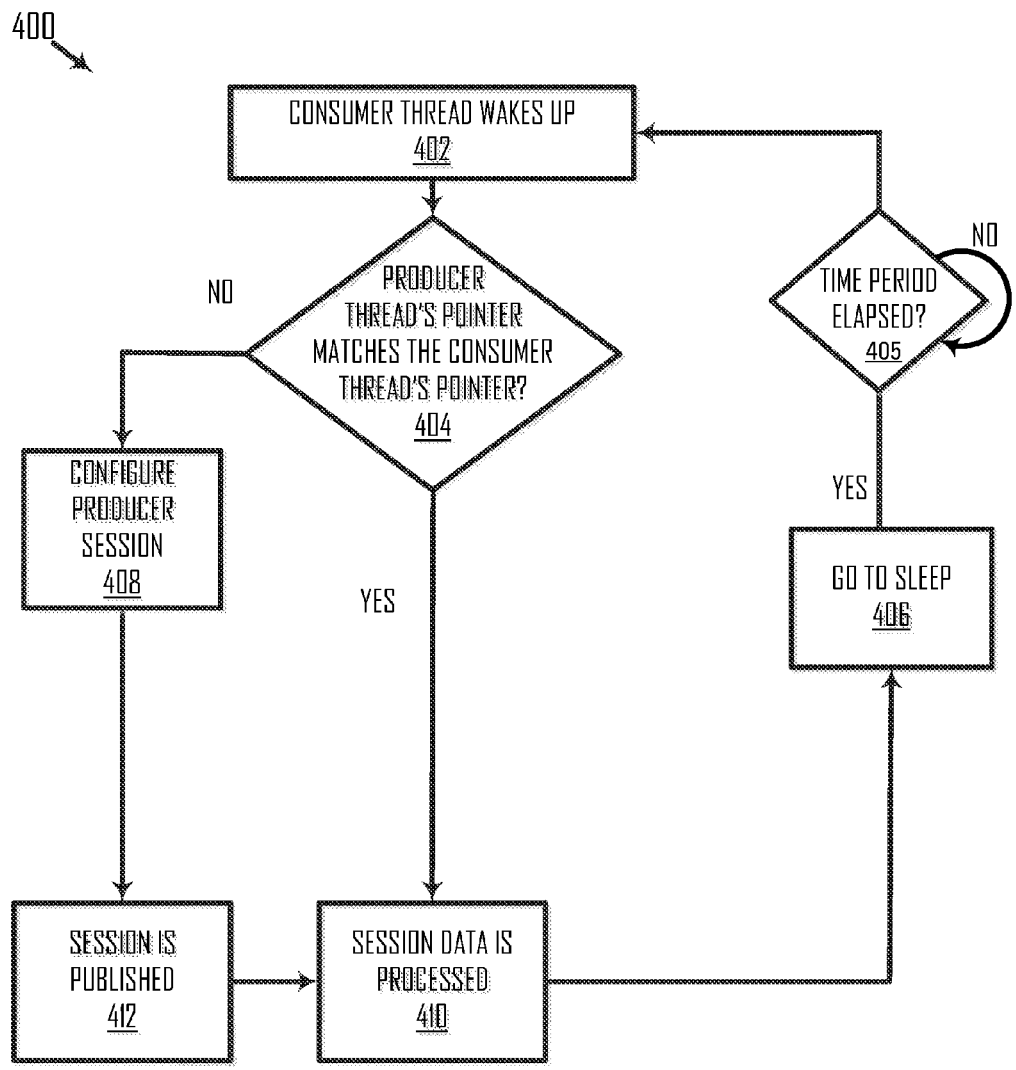
FIG. 4 is a flowchart illustrating a method of a consumer thread processing a session, according to an embodiment.
Figure 5:
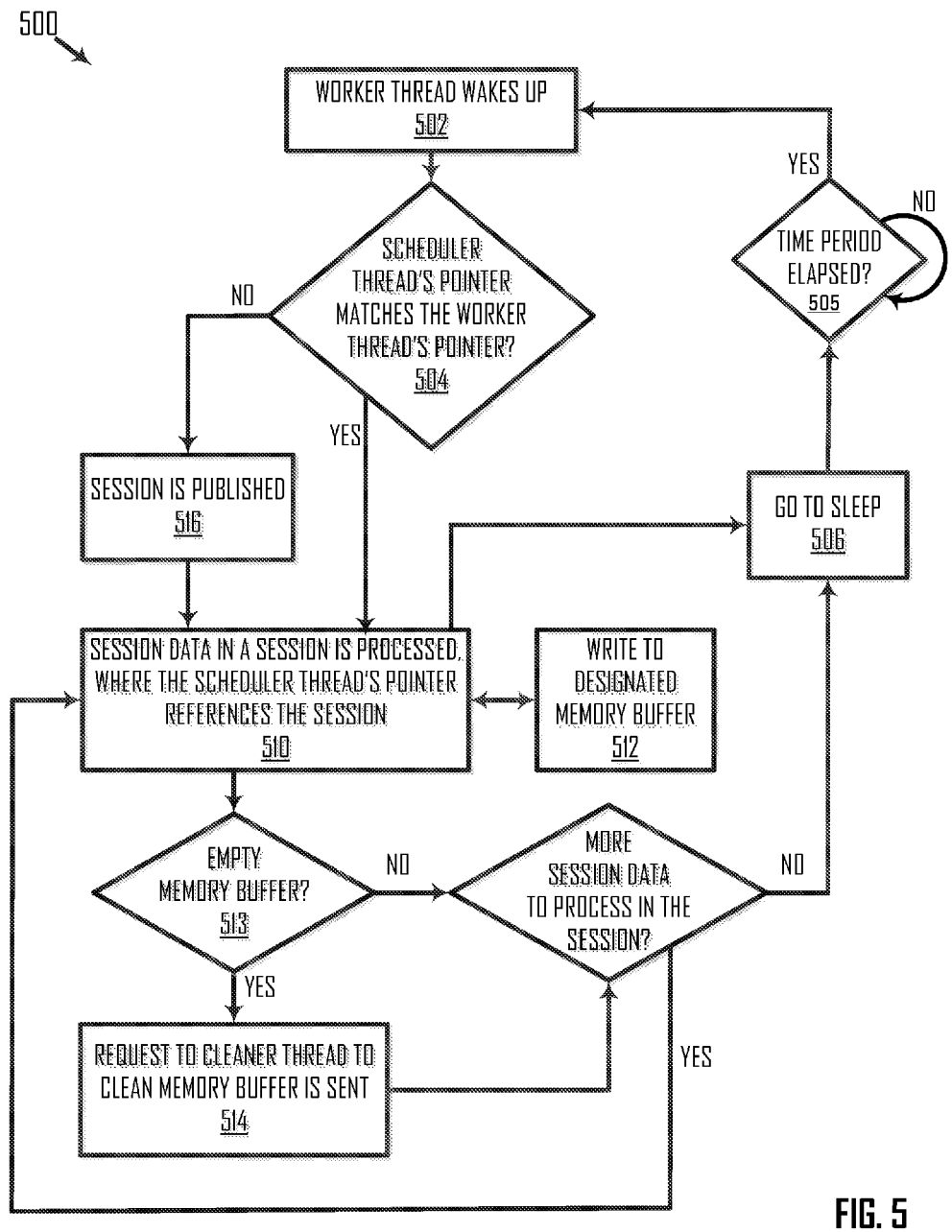
FIG. 5 is a flowchart illustrating a method of a worker thread processing a session, according to an embodiment.

FIG. 3 is a flowchart illustrating a method 300 of a session producer thread processing a session, according to an embodiment. FIG. 4 is a flowchart illustrating a method 400 of a consumer thread processing a session, according to an embodiment. FIG. 5 is a flowchart illustrating a method 500 of a worker thread processing a session, according to an embodiment. Methods 300, 400, and 500 are not meant to be limiting and may be used in other applications. Methods 300, 400, and 500 are discussed in relation to FIGS. 1 and 6A-6E.

In FIG. 3, method 300 includes blocks 302-312. In a block 302, a session producer thread wakes up. In an example, the session producer thread is rotator thread 122. After a time period, rotator thread 122 may awaken every 15 minutes. This is merely an example, and the time period in which rotator thread 122 sleeps and awakens may vary.

When the session producer thread wakes up, process flow may proceed to a block 304. In block 304, the session producer thread determines whether to publish a new session to its consumer threads below it in the waterfall before proceeding to perform its own work in block 310. In an example, if rotator thread 122 obtains a configuration notification to create a session with new data, rotator thread 122 creates session 140. Otherwise, rotator thread 122 creates a new session 140, to create a new archive, but using the same configuration. The configuration notification may include information on how to build a session, general parameters for the session, and how to initialize the session.

Other heuristics may be implemented. For example, an embodiment the scheduler thread 124 wakes up, and if it receives a new session pointer, in step 304 scheduler thread 124 may decide to publish the new session to its consumers. In a block 308 scheduler thread 124 may update the session with the configuration it needs to do, in this case, initialize the work queues for the worker threads. Scheduler thread 124 then proceeds to publish the session in block 312, and then performs work on the session in block 310, which may include activating some of the work queues, before going to block 306.

In a block 306, if the session producer thread determines no further work is to be performed, the session producer thread may go back to sleep. After a time period has elapsed in block 305, process flow proceeds to block 302, where the producer thread wakes up.

If the session producer thread determines to publish a new session, process flow proceeds to a block 308. In block 308, the session producer thread prepares a session so it can be used by the consumer threads. The session producer thread may prepare the session by initializing it. After the session producer thread initializes the session, process flow proceeds to a block 312. In block 312, the session is published by updating the producer thread's session pointer. In an example, rotator thread 122 is the session producer thread and creates and prepares session 140. As session 140 is being created, memory addresses are newly allocated from memory for session 140. Session 140 is self-contained and contains information (e.g., session data 144) that is needed for threads (e.g., scheduler thread 124 and worker threads 126A-126C) to perform work on session 140.

Session data 144 may include a first set of configuration items on which a thread that is located at a level below rotator thread 122 in hierarchy 142 depends. Rotator thread 122 may process session data 144 by processing the first set of configuration items. In an example, session data 144 includes data related to the archive file, and rotator thread 122 rotates archive files every 10-15 minutes. Rotator thread 122 creates and initializes the archive file so that session 140 is ready to be "pushed down" hierarchy 142. In an example, rotator thread 122 creates session 140 and processes the first set of configuration items in session data 144 by opening an archive file associated with session 140, creating data in memory that tracks the file, and obtaining a file descriptor that enables writing to the file. An input/output (I/O) system call refers to open files using a file descriptor. A file descriptor may be obtained by a system call (e.g., the open( ) system call), which takes a pathname argument specifying a file upon which I/O is to be performed.

In the example illustrated in FIG. 1, session data 144 includes a field for file descriptor 152, and rotator thread 122 may process the first set of configuration items by setting file descriptor 152 to "open" to enable writing to the archive file. Scheduler thread 124 is dependent on rotator thread 122 processing the first set of configuration items (e.g., file descriptor 152 being set to "open") in order to start and finish its own tasks.

If the producer thread has finished processing the first set of configuration items, process flow proceeds to a block 312. In block 312, the session is published. In keeping with the above example, if rotator thread 122 has created session 140, opened an archive file associated with session 140, created data in memory that tracks the file, and set file descriptor 152 in session data 144 to "open", rotator thread 122 may publish session 140. Rotator thread 122 may publish session 140 by updating rotator thread 122's pointer 132 to reference session 140.

Figure 6A:
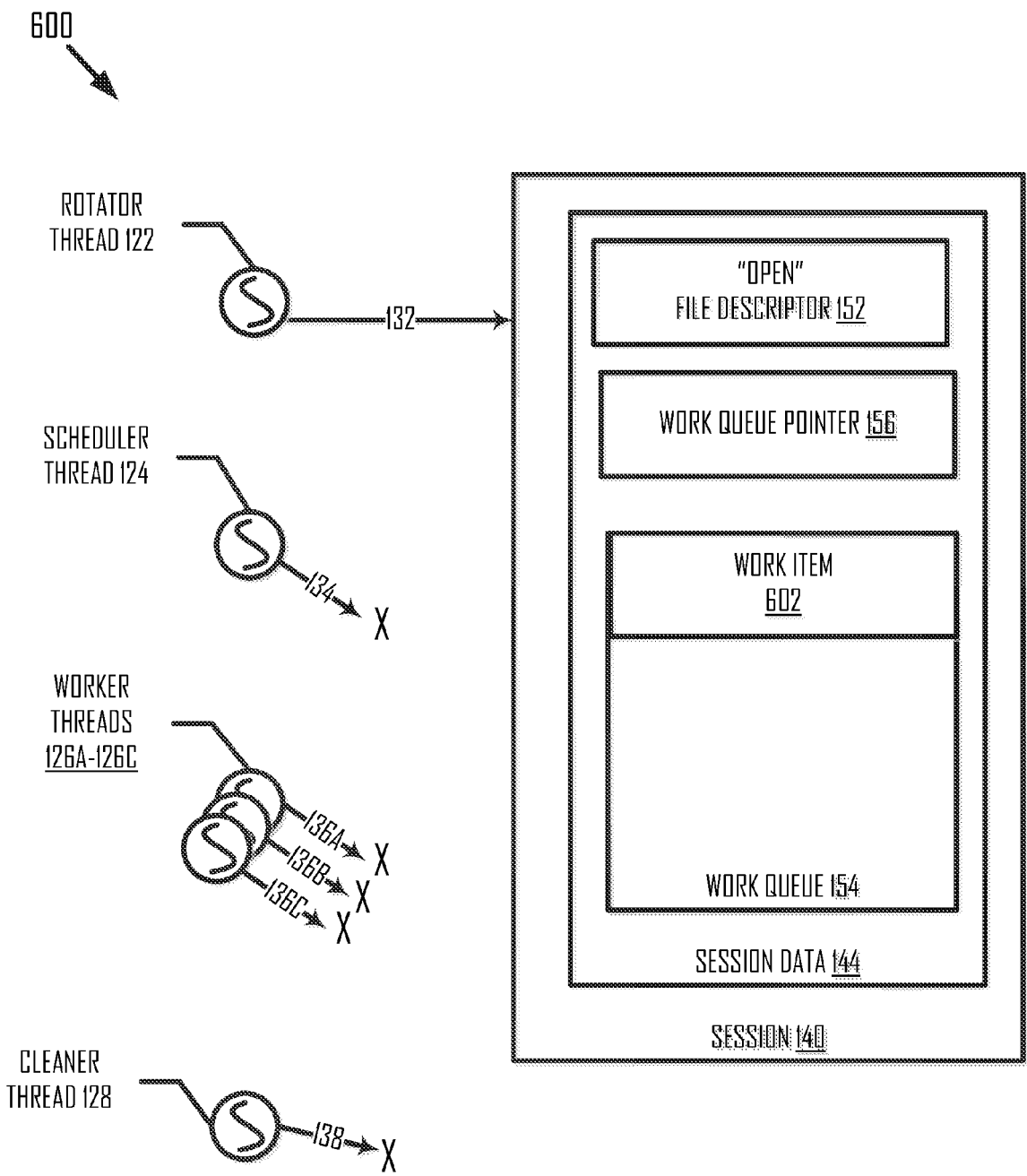
FIG. 6A is a block diagram illustrating communication of session state information between the rotator thread and scheduler thread, according to an embodiment.

FIG. 6A is a block diagram 600 illustrating communication of session state information between the session producer thread and a consumer thread, according to an embodiment. In FIG. 6A, rotator thread 122 has set file descriptor 152 to "open". Session 140 is self-contained, and the value of file descriptor 152 is passed along in session 140 from rotator thread 122 to the threads below it in hierarchy 142. Additionally, in FIG. 6A rotator thread 122's pointer 132 references session 140. After rotator thread 122 publishes session 140, threads below rotator thread 122 in hierarchy 142 may recognize that a "new session" has been created and process session 140 in turn as session 140 moves down hierarchy 142. For example, the cleaner thread 128 may write and close the open file. As discussed, these are merely examples of the tasks that the threads perform and they may perform different tasks from that described.

It is understood that additional processes may be performed before, during, or after blocks 302-312 discussed above. It is also understood that one or more of the blocks of method 300 described herein may be omitted, combined, or performed in a different sequence as desired.

For example, method 300 may include a block that initializes the session pointer to null. In such an example, when the session is published (block 312) the session pointer may be initialized to null. Additionally, when it is determined to publish a new session (block 304) the session pointer may be initialized to null. After the session pointer may be initialized to null, it may be determined whether there is more session data to process. In response to determining that there is more session data to process, process flow may proceed to block 310. In response to determining that there is no more session data to process, process flow may proceed to block 306.

B. Consumer Thread Obtains the Session and Processes Session Data in the Session In FIG. 4, method 400 includes blocks 402-412. In a block 402, a consumer thread wakes up. In an example, the consumer thread is scheduler thread 124. Although the consumer thread is described as being scheduler thread 124, it should be understood that the consumer thread may be any thread in hierarchy 142 that consumes data that is produced by a producer thread.

After a time period, scheduler thread 124 may awaken. In an example, scheduler thread 124 awakens every second. In such an example, scheduler thread 124 may wake up and perform work every second depending on configuration of the session. This is merely an example, and the time period in which scheduler thread 124 sleeps and awakens may vary.

When the consumer thread wakes up, process flow may proceed to a block 404. In block 404, it is determined whether a producer thread's pointer (e.g., the thread above the consumer thread in hierarchy 142) matches the consumer thread's pointer. In an example, scheduler thread 124 reads rotator thread 122's pointer and compares it to scheduler thread 124's pointer. If rotator thread 122's pointer and scheduler thread 124's pointer reference the same memory address, scheduler thread 124 may determine that rotator thread 122's pointer and scheduler thread 124's pointer match. In contrast, if rotator thread 122's pointer and scheduler thread 124's pointer reference different memory addresses, scheduler thread 124 may determine that rotator thread 122's pointer and scheduler thread 124's pointer do not match.

In response to determining that the producer thread's pointer matches the consumer thread's pointer (in block 404), the consumer thread may perform work in block 410. Once the work is done the thread may determine to go to sleep (in block 406). After a time period has elapsed (in block 405), process flow proceeds to block 402, where the consumer thread wakes up after the time period has elapsed. Rotator thread 122's pointer and scheduler thread 124's pointer may match, for example, if they both reference the null value, in which case no work will be done in block 410 (see FIG. 1) or if they both reference a common session, in which case the consumer thread will perform a task in block 410 based on the content of the session data (see FIG. 6B). In an example, if rotator thread 122's pointer and scheduler thread 124's pointer both reference a null value, then scheduler thread 124 has nothing to do yet and can go back to sleep. In such an example, rotator thread 122 may not have created and published session 140 yet or rotator thread 122 may have already created session 140 but has not yet processed the first set of configuration items upon which scheduler thread 124 depends, and hence not yet published it in pointer 132. In another example, if rotator thread 122's pointer and scheduler thread 124's pointer both reference a common session, then scheduler thread 124 has already processed a set of configuration items on which consumer threads of scheduler thread 124 depend and has already published session 140.

In a block 408, in response to determining that the producer thread's pointer does not match the consumer thread's pointer, the consumer thread may further initialize the session data pointed to by the producer thread's pointer, before in turn, publishing the session by copying the producer thread's session pointer in the consumer thread's session pointer in block 412. By doing so the consumer thread informs other threads that it is processing the session. Process flow then proceeds to block 410 and processes the session in a similar manner as described in above.

Figure 6B:
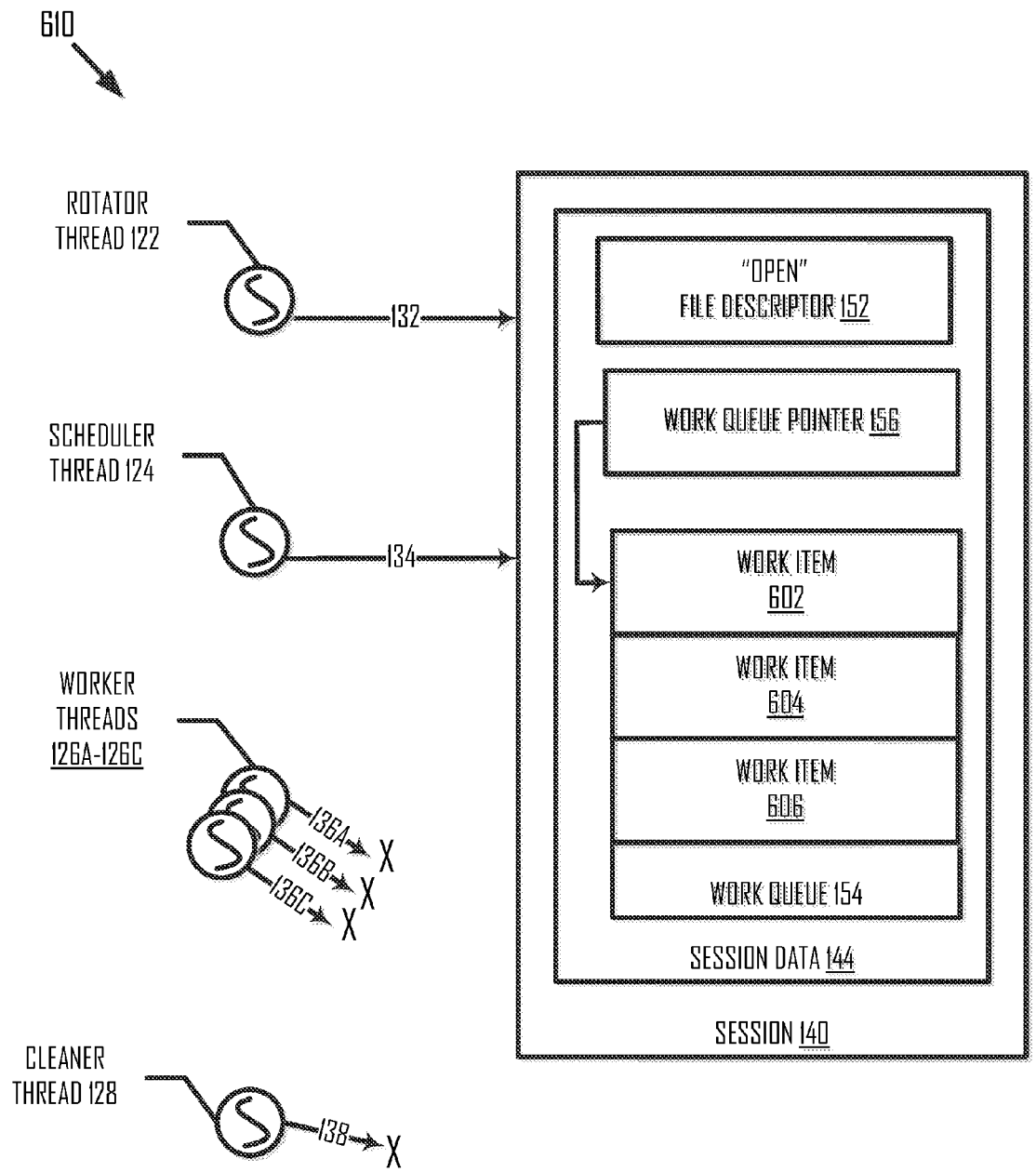
FIG. 6B is a block diagram illustrating communication of session state information between the scheduler thread and worker threads, according to an embodiment.
Figure 6C:
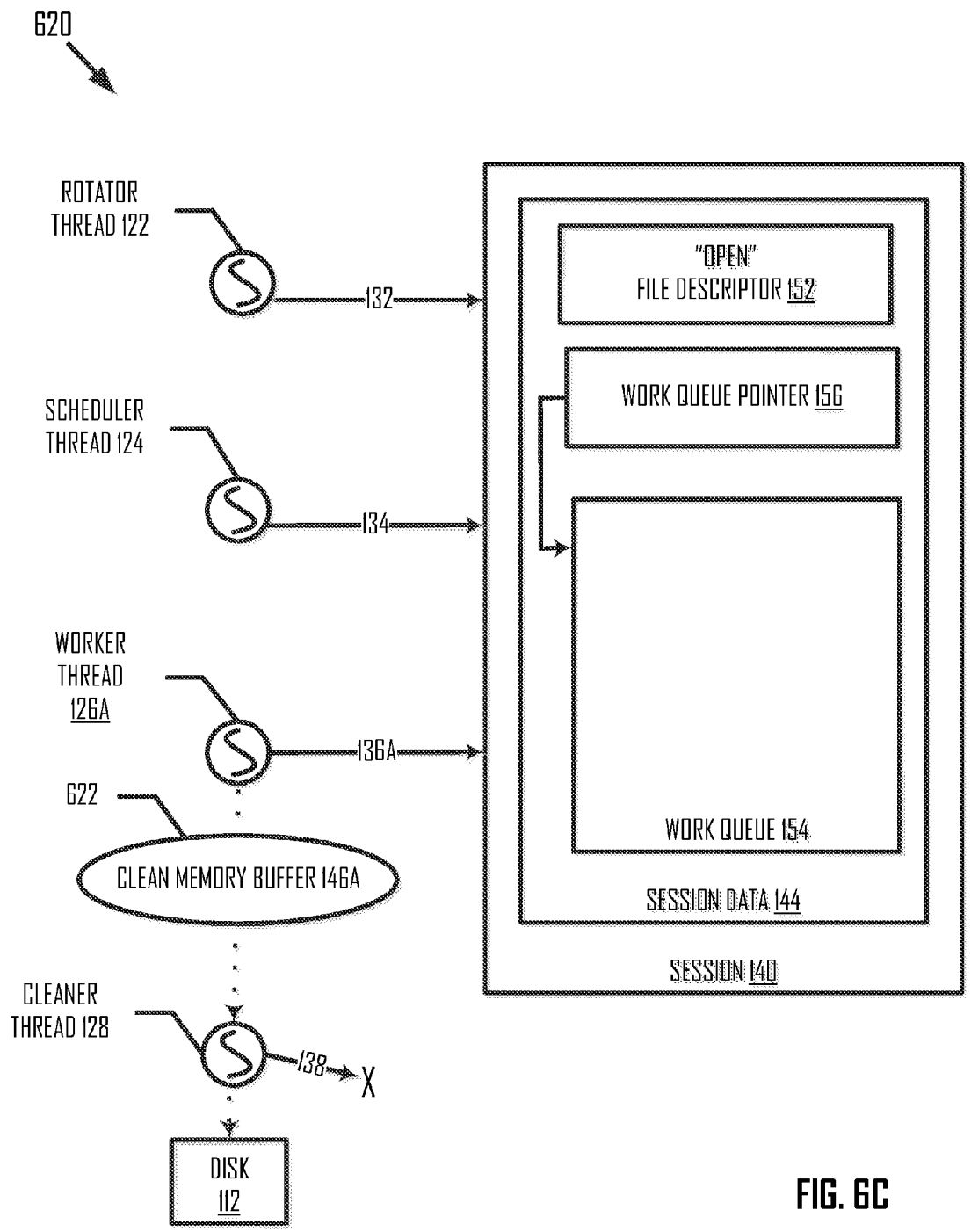
FIG. 6C is a block diagram illustrating communication of session state information between a worker thread and the cleaner thread, according to an embodiment.
Figure 6D:
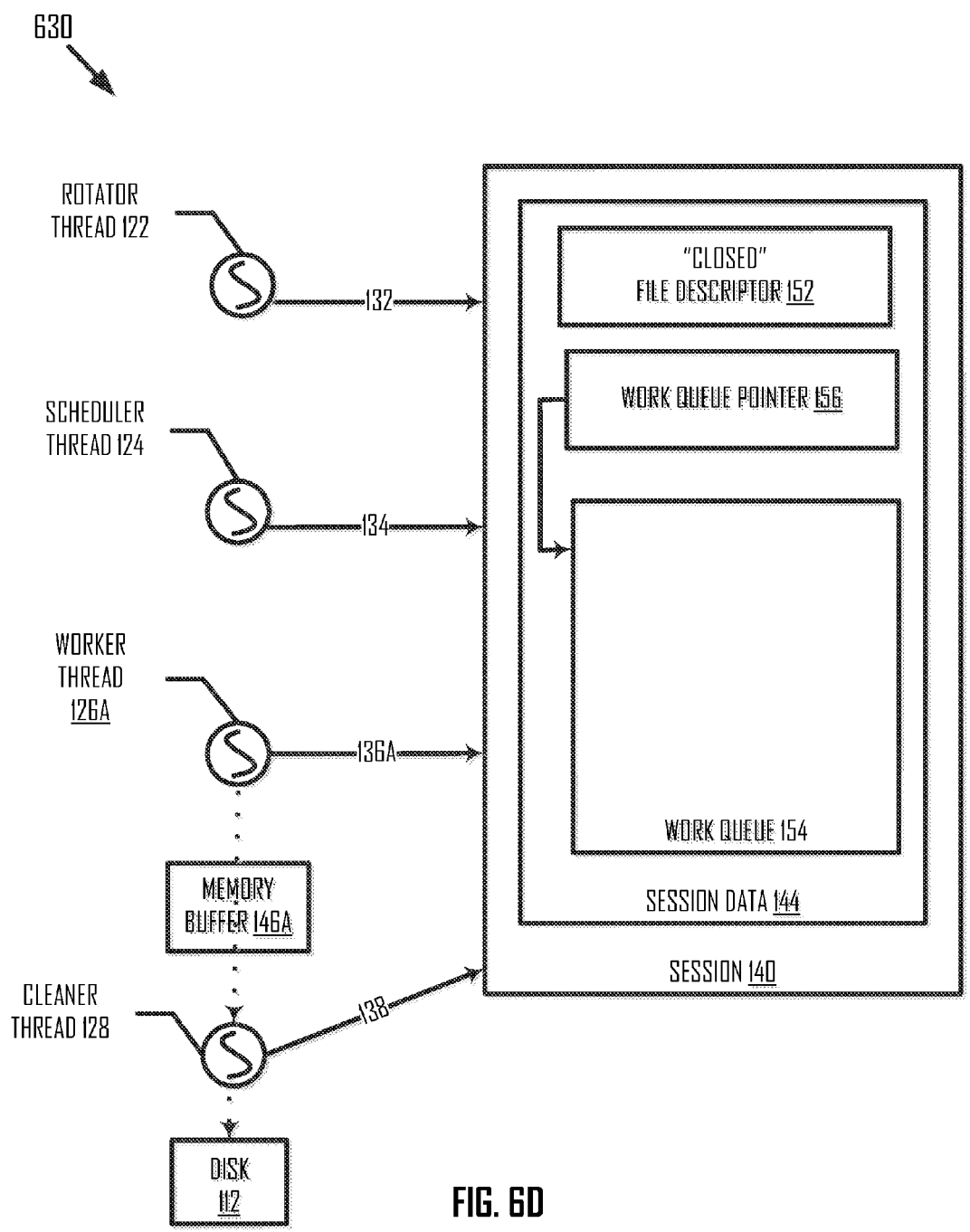
FIG. 6D is a block diagram illustrating the session being closed by the cleaner thread, according to an embodiment.
Figure 6E:
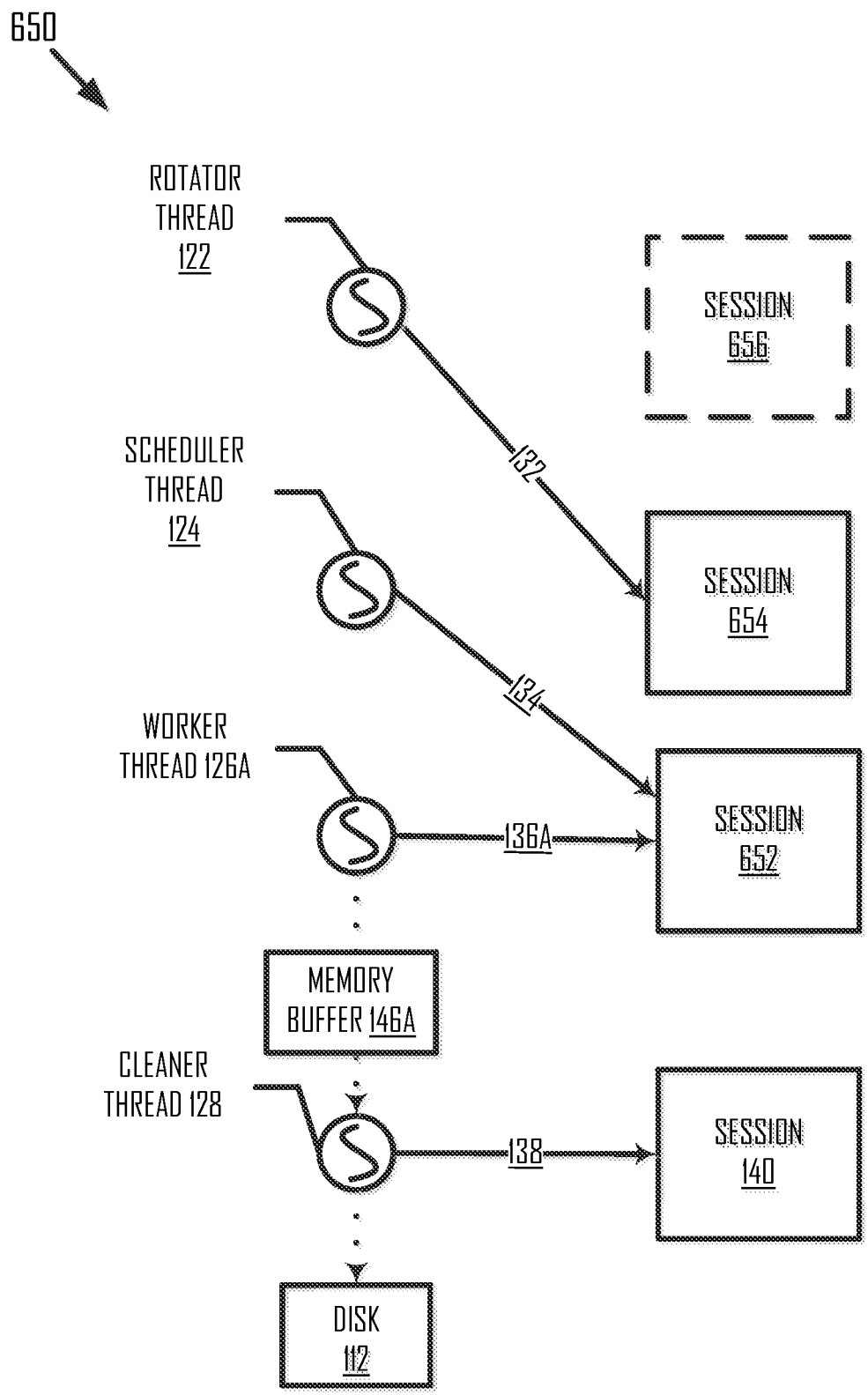
FIG. 6E is a block diagram illustrating multiple sessions that are processed by the plurality of threads in the multi-threaded process, according to an embodiment.

In an example, rotator thread 122's pointer and scheduler thread 124's pointer do not match if they reference different sessions (see FIG. 6E). In another example, rotator thread 122's pointer and scheduler thread 124's pointer do not match if rotator thread 122's pointer references a session while scheduler thread 124's pointer references a null value. For example, in FIG. 6A, rotator thread 122's pointer and scheduler thread 124's pointer do not match because rotator thread 122's pointer references session 140 while scheduler thread 124's pointer references a null value. When the producer rotator thread's pointer does not match the consumer scheduler thread's pointer, scheduler thread 124 knows that the first set of configuration items, performed by the rotator thread in the session has been processed, and it is scheduler thread 124's turn to process session data 144 in session 140. Scheduler thread 124 will eventually update its pointer 134 to match the rotator thread's session pointer, after performing a second set of initializations to the session data 144 during block 408. It is important to note that while scheduler thread 124's pointer is illustrated as referencing a null value, scheduler thread 124 may be in the process of processing session data 144.

The producer thread manages its own global pointer and shares the global pointer with the consumer thread. No other thread is allowed to modify its global pointer. The producer thread shares the global pointer with the consumer threads so that the consumer threads are able to read the producer thread's global pointer. Additionally, the consumer thread manages its own global pointer. No other thread is allowed to modify its global pointer. A consumer thread may share its global pointer with the producer threads if they want to know the state of the consumer thread. The consumer thread may also share the consumer thread's global pointer with other threads lower in the waterfall which in turn consume data produced by the consumer thread. A thread may be both a producer and a consumer thread.

The consumer thread also has its own local pointers. In response to determining that the producer thread's global pointer does not match the consumer thread's global pointer, the consumer thread may copy the value of the producer thread's global pointer into a local pointer of the consumer thread. As such, the consumer thread may have a local pointer that references session 140 and may manipulate the pointer locally. The consumer thread may modify session data 144 using the local pointer. When the consumer thread is finished modifying session data 144, the consumer thread may copy its local pointer to the consumer thread's global pointer that is shared with the next one or more threads below the consumer thread in hierarchy 142. Accordingly, the next one or more threads is able to determine that session 140 is ready for processing by it.

Scheduler thread 124 may process session data 144 by processing a second set of configuration items. In FIG. 6A, session 140 includes file descriptor 152, work queue 154, and work queue pointer field 156. In an example, scheduler thread 124 processes the second set of configuration items by initializing work queue 154, placing one or more work items in work queue 154, and clearing work queue pointer 156 until there are no more work queue items to process. Scheduler thread 124 modifies the state of session 140's work queue to schedule work and may also time stamp the session. Scheduler thread 124 initializes work queue 154 and work queue pointer 156 so that session 140 is ready to be "pushed down" hierarchy 142 and processed by threads below scheduler thread 124 in the hierarchy. This may complete the work for block 408. The scheduler thread, in block 412 then updates the scheduler thread session pointer 134 to point to the session 140 and then proceeds in block 410 to schedule work by setting the work queue pointer 156 to reference the first work item to be processed in the work queue 154. Scheduler thread 124 may awaken worker threads to process work items in work queue 154, and worker threads may go to sleep when they are done.

In an example, a work item is an invocation of a subsystem application programming interface (API) to obtain a subsystem's performance statistics and metrics. Work queue pointer 156 may be updated by scheduler thread 124 and/or the worker threads as the work items are being processed from work queue 154, until the work queue is empty at which point the worker threads may go to sleep.

Referring back to FIG. 4, if the consumer thread has finished processing the second set of configuration items process flow proceeds to a block 412. In block 412, the session is published. Worker threads 126A-126C may be dependent on work queue 154 and work queue pointer 156 being initialized in order to start and finish their tasks. If scheduler thread 124 has initialized work queue 154, placed one or more work items in work queue 154, and initialized work queue pointer 156 to reference the first work item to be processed in work queue 154, scheduler thread 124 may publish session 140. Scheduler thread 124 may publish session 140 by updating scheduler thread 124 pointer's 134 to reference session 140.

FIG. 6B is a block diagram 610 illustrating communication of session state information between scheduler thread 124 and worker threads 126A-126C, according to an embodiment. As illustrated in the example of FIG. 6B, scheduler thread 124 has initialized work queue 154, placed work items 602, 604, and 606 in work queue 154, and initialized work queue pointer 156 to reference work item 602 in work queue 154 for processing by one or more worker threads. Session 140 is self-contained, and work queue 154 and work queue pointer 156 may be passed along in session 140 from rotator thread 122 to scheduler thread 124 and then to the threads below in hierarchy 142. Additionally, in FIG. 6B scheduler thread 124's pointer 134 references session 140.

After scheduler thread 124 publishes session 140, threads below scheduler thread 124 in hierarchy 142 may recognize that state information in session 140 has changed and may process session 140 in turn as session 140 "moves down" hierarchy 142. At this point, worker threads 126A-126C know that the second set of configuration items has been processed (e.g., work queue 154 and work queue pointer 156 have been initialized) because scheduler thread 124 has published session 140, and henceforth the session 140 is in a valid state for the worker threads 126A-126C. After scheduler thread 124 publishes session 140, worker threads 126A-126C may consume and process session data 144 in session 140, including the data produced by scheduler thread 124.

It is understood that additional processes may be performed before, during, or after blocks 402-412 discussed above. It is also understood that one or more of the blocks of method 400 described herein may be omitted, combined, or performed in a different sequence as desired. In an example, when scheduler thread 124 wakes up, it may determine whether to reset any of the fields in session data 144. For example, scheduler thread 124 may determine whether to reset work queue 154 in session data 144.

In another example, method 400 may enable the consumer thread to run until its task is completed. In another example, the consumer thread is allowed to run for a given period of time, and after the given period of time elapses the consumer thread goes to sleep. In such an example, when the consumer thread wakes up, it may determine whether there is session data to be processed in a session. If the consumer thread determines that there is no session data in a session to process, process flow may proceed to block 406 and the consumer thread may go back to sleep. In contrast, if the consumer thread determines that there is session data in a session to process, process flow may proceed to block 410. For example, scheduler thread 124 may continue to process session data 144 from where scheduler thread 124 left off before it went to sleep. The consumer thread may determine that there is session data to be processed in a session if, for example, the consumer thread went to sleep before it was done processing the session for consumption by the threads below the consumer thread in hierarchy 142.

C. Worker Thread Processes Work Items Placed in the Work Queue

In FIG. 5, method 500 includes blocks 502-516. The following is a description of worker thread 126A. This description applies as well to other worker threads (e.g., worker thread 126B or 126C). In a block 502, a worker thread wakes up. After a time period, worker thread 126A may awaken. The worker thread may awaken when a work item is placed in work queue 154 and may go to sleep when no more work items are in work queue 154. In an example, worker thread 126A awakens every ten seconds or earlier by a signal from the scheduler thread if session 140 is ready to be processed by worker thread 126A. This is merely an example, and the time period in which any particular worker thread sleeps and awakens may vary.

When the worker thread wakes up, process flow may proceed to a block 504. In block 504, it is determined whether a producer thread's pointer (e.g., the thread above the worker thread in hierarchy 142) matches the worker thread's pointer. In an example, worker thread 126A reads scheduler thread 124's pointer and compares it to worker thread 126A's pointer. If scheduler thread 124's pointer and worker thread 126A's pointer reference the same memory address, worker thread 126A may determine that scheduler thread 124's pointer and worker thread 126A's pointer match. In contrast, if scheduler thread 124's pointer and the worker thread 126A's pointer reference different memory addresses, worker thread 126A may determine that scheduler thread 124's pointer and worker thread 126A's pointer do not match.

In a block 506, in response to determining that work queue pointer 156 is null and that there no more items to process in work queue 154, the worker thread may go to sleep. After a time period has elapsed in block B505, process flow proceeds to block 502, where the worker thread wakes up after the time period has elapsed.

In a block 504, scheduler thread 124's pointer and worker thread 126A's pointer may match, for example, if they both reference the null value (see FIG. 1) or if they both reference a common session (see FIG. 6C). In an example, if scheduler thread 124's pointer and worker thread 126A's pointer both reference a null value, then worker thread 126A has nothing to do yet and can go back to sleep. Accordingly, there is no more session data to process (block 510) and the worker thread may go to sleep (block 506). In such an example, scheduler thread 124 may not have processed the second set of configuration items upon which worker thread 126A depends (e.g., initializing work queue 154 or work queue pointer 156). In another example, if scheduler thread 124's pointer and worker thread 126A's pointer both reference a common session, then no more work items are in work queue 154 in session 140 and worker thread 126A has published session 140. Worker thread 126A waits for scheduler thread 124 to awaken and resets work queue pointer 156 to point to the first work item 602 of work queue 154.

In a block 516, in response to determining that the producer thread's pointer does not match the worker thread's pointer, the session is published. In an example, in response to determining that the producer thread's pointer does not match the worker thread's pointer the producer thread's pointer is copied to the worker thread's pointer, as in this example no tertiary configuration needs to be done by the worker thread. In an example, worker thread 126A may publish session 140 by updating worker thread 126A's pointer 136A to reference session 140. Process flow proceeds to block 510, where the session data in a session is processed. In an example, session data may be processed by calling a subsystem's API to collect data. In a block 512, worker thread 126A may store a result of the API in its designated buffer.

In an example, scheduler thread 124's pointer and worker thread 126A's pointer do not match if they reference different sessions. In another example, scheduler thread 124's pointer and worker thread 126A's pointer do not match if scheduler thread 124's pointer references a session while worker thread 126A's pointer references a null value. For example, in FIG. 6B, scheduler thread 124's pointer and worker thread 126A's pointer do not match because scheduler thread 124's pointer references session 140 while worker thread 126A's pointer references a null value. When the producer thread's pointer does not match the worker thread's pointer, the worker thread knows that the second set of configuration items in the session has been processed, and it is the worker thread's turn to process session data 144 in session 140. Worker thread 126A will eventually update its pointer to scheduler thread 124's session. It is important to note that while worker thread 126A's pointer is illustrated as referencing a null value, worker thread 126A may be in the process of processing work queue 154 in session data 144.

A worker thread may process session data 144 by processing a third set of configuration items. In an example, the worker thread processes the third set of configuration items by processing work queue 154. Worker thread 126A retrieves one or more work items from work queue 154. For example, worker thread 126A retrieves work item 602, which is referenced by work queue pointer 156, and processes work item 602.

A work item may be a query to a subsystem for its specific counters or performance metrics and may contain a subsystem identifier and information as to which counters are being collected. In keeping with the above example in which a work item is an invocation of a subsystem API to obtain the subsystem's performance statistics and metrics, work item 602 is an API call into NIC 106 (see FIG. 1) that causes the return of NIC 106's performance statistics and metrics. The subsystem may expose a function that returns the one or more specific counters requested. The performance data for NIC 106 may include any of a variety of data tracked by the system that has an informational value with respect to how NIC 106 has performed. Examples include software counters that describe latency of data requests, software counters that track errors at network connections, and the like. Worker thread 126A may invoke an API at NIC 106 and receive NIC 106's performance data.

After worker thread 126A retrieves work item 602, worker thread 126A or scheduler thread 124 may move work queue pointer 156 to point to the next work item (e.g., work item 604) in work queue 154 so that this or the next available worker thread (e.g., worker thread 126B or worker thread 126C) retrieves the next work item and processes it. A worker thread may retrieve a work item from work queue 154 by using a separate lock that is specific to the work queue activity, and is unrelated to the activity of moving sessions between threads, which keeps the work queue locking straightforward and localized. In an example, it may be possible to make a lockless work queue, in which case the whole process may be implemented using lockless mechanisms. The worker threads process the work items in work queue 154 for the cleaner thread, lower in hierarchy 142.

In a block 512, the worker thread may write the returned performance information (e.g., statistics and metrics) to the memory buffer designated to the worker thread. In an example, worker thread 126A writes the results of the API call to NIC 106 into memory buffer 146A. The worker threads may continue to process work items placed in work queue 154 until no more work items are left in work queue 154. Process flow may go back and forth between blocks 510 and 512.

Worker thread 126A may be a producer thread that processes session data in session 140 for consumption by cleaner thread 128. Cleaner thread 128 may be dependent on data being written to a memory buffer before cleaner thread 128 starts and finishes its task. In a block 513, the worker thread may determine whether the memory buffer that is designated to the worker thread should be emptied.

In a block 514, in response to determining that the worker thread's designated memory buffer should be emptied, a request to the cleaner thread to empty the memory buffer is sent. In an example, in response to determining that memory buffer 146A should be emptied, worker thread 126A sends a request to cleaner thread 128 to empty memory buffer 146A. In an example, if the worker thread realizes that its designated memory buffer has become oversubscribed, the worker thread may determine that its designated memory buffer should be emptied. The request may cause cleaner thread 128 to empty the designated memory buffer and write the data stored in the memory buffer to disk 112. When cleaner thread 128 writes the data stored in the memory buffer to disk 112, cleaner thread 128 may remove the data from the memory buffer or mark the data as deleted. To avoid this situation, cleaner thread 128 may wake up at regular intervals and preemptively check the worker thread 126A-126C buffers and write them to disk. In such a situation, worker threads may only signal the cleaner thread during a peak of data, where the amount of data written to the buffer is greater than the amount of data committed to disk at regular intervals.

The worker thread may determine whether there is more session data to process in the session. In an example, if the worker thread determines that there is more session data to process in the session, process flow may proceed to block 510, where session data in the session is processed. In such an example, the worker thread may continue to retrieve work items from work queue 154. In another example, if the worker thread determines that there is no more session data to process in the session, process flow may proceed to a block 506, where the cleaner thread goes to sleep.

FIG. 6C is a block diagram 620 illustrating communication of session state information between worker thread 126A and cleaner thread 128, according to an embodiment. After worker thread 126A publishes session 140, threads below worker thread 126A in hierarchy 142 may recognize that state information in session 140 has changed and may process session 140 in turn as session 140 moves down hierarchy 142. After worker thread 126A publishes session 140, cleaner thread 128 may consume and process session data 144 in session 140, including the data produced by worker thread 126A.

As illustrated in the example of FIG. 6C, the worker threads have started processing work items in work queue 154 and may write the results to the memory buffer. Worker thread 126A may send a request 622 to cleaner thread 128 that causes cleaner thread 128 to write the data stored in memory buffer 146A to disk 112, or the cleaner thread may wake up regularly to scan and empty buffers 146A-146C.

It is also understood that additional processes may be performed before, during, or after blocks 502-516 discussed above. It is also understood that one or more of the blocks of method 500 described herein may be omitted, combined, or performed in a different sequence as desired.

For example, method 500 may enable the worker thread to run until its task is completed. In another example, the worker thread may be allowed to run for a given period of time, and after the given period of time elapses the worker thread goes to sleep. If the worker threads have not finished processing the work items in session data 144, scheduler thread 124 may raise an error and allow the worker threads to continue processing session data 144 in session 140 until all of their work has been completed (e.g., all of the work items in work queue 154 have been processed).

D. Cleaner Thread Writes the Data Stored in a Memory Buffer to Disk

Cleaner thread 128 may write the data stored in a memory buffer to disk 112. In the example described above, a worker thread may send a request to cleaner thread 128 to write the data stored in the worker thread's designated memory buffer to disk 112. The request may wake up cleaner thread 128. In an example, if the memory buffer has a threshold amount of used space or free space, the worker thread may send the communication to cleaner thread 128. In another example, after a time period has elapsed, cleaner thread 128 awakens and scans the memory buffers. In an example, cleaner thread 128 awakens every ten seconds. If a scanned memory buffer has data to write to disk 112, cleaner thread 128 may write the data to disk 112. Alternatively, if a scanned memory buffer has a threshold amount of used space or free space, cleaner thread 128 may write the data stored in the scanned memory buffer to disk 112.

Cleaner thread 128 writes data stored in a memory buffer to disk 112 to ensure that the performance data is stored in the archive file associated with session 140. It may be disadvantageous to wait until a memory buffer is partially full before writing the data stored in the memory buffer to disk 112 because a crash may result in a lot of missing performance data.

In keeping with the above example of writing performance data of the subsystems to an archive file, cleaner thread 128 updates the archive file with the performance data stored in the worker threads' designated memory buffers. In an example, when there is no more performance data to store in the archive file, cleaner thread 128 closes the archive file. In another example, when cleaner thread 128 notices a new session that is created by rotator thread 122, cleaner thread 128 closes the old session and eventually writes data to the new session. When cleaner thread 128 closes the archive file, cleaner thread 128 sets file descriptor 152 to "close" and publishes session 140. In an example, cleaner thread 128 determines whether all of the worker threads are processing the same session. In response to determining that all of the worker threads are processing the same session, cleaner thread 128 may publish session 140. Cleaner thread 128 may publish session 140 by updating cleaner thread 128's pointer 138 to reference session 140.

FIG. 6D is a block diagram 630 illustrating session 140 being closed by cleaner thread 128, according to an embodiment. As illustrated in the example of FIG. 6D, cleaner thread 128 has written data stored in memory buffer 146A to disk 112 and has set file descriptor field to "close". Thus, cleaner thread 128 has closed out the archive file associated with session 140 and "destroys" the session. Additionally, in FIG. 6D cleaner thread 128's pointer 138 references session 140. After cleaner thread 128 publishes session 140, cleaner thread 128 may write performance data to another archive file that is associated with another session.

IV. Exception Handling

A. Performance Variations

In the example illustrated in FIG. 6D, rotator thread 122, scheduler thread 124, and worker thread 126A all reference session 140. Rotator thread 122 may create more sessions that are passed through the hierarchy of threads. A session is independent from a thread. Computing device 102 may be slow and may not be able to handle the processing of another session without performance issues. For example, the memory buffers designated to the worker threads may be full and cleaner thread 128 may be slow in writing the data stored in the memory buffers to disk 112.

FIG. 6E is a block diagram 650 illustrating multiple sessions that are processed by the plurality of threads in multi-threaded process 120, according to an embodiment. Rotator thread 122 may create sessions 140, 652, and 654 over time and pass them down the waterfall. Each session has its own session data with fields that are modifiable by threads in hierarchy 142. Each of the sessions will be passed down through hierarchy 142 from rotator thread 122 to cleaner thread 128.

From bottom to top in FIG. 6E, rotator thread 122, scheduler thread 124, worker thread 126A, and cleaner thread 128 have processed session 140 and have published session 140. Additionally, rotator thread 122, scheduler thread 124, and worker thread 126A have processed a session 652, and scheduler thread 124 and worker thread 126A have published session 652. Rotator thread 122 has processed and published session 654, which has not yet been published by scheduler thread 124. Session 654 may have its own fields (e.g., file descriptor, work queue, and work queue pointer), and scheduler thread 124 may not have yet seen session 654 or may be in the process of processing the session data in session 654 to perform the secondary initialization prior to publishing the session.

In FIG. 6E, scheduler thread 124 has not published session 654. Accordingly, scheduler thread 124 has not processed the set of configuration items in session 654 upon which the worker threads depend. For example, scheduler thread 124 may not yet have initialized the work queue, placed work items in the work queue, and initialized the work queue pointer in session 654 such that the worker threads can properly process the session data in session 654. Rotator thread 122 references session 654, scheduler thread 124 and worker thread 126A reference session 652, and cleaner thread 128 references session 140. Accordingly, rotator thread 122 references a different session from the threads below it, and scheduler thread 124 and worker thread 126A reference a different session from cleaner thread 128.

Rotator thread 122 may awaken and want to create a new session 656 and push it down to the threads in hierarchy 142 for processing. Rotator thread 122 may be able to determine whether the threads in hierarchy 142 are able to handle processing of another session so that no session is leaked. In an example, rotator thread 122 looks down to the other threads in hierarchy 142 to determine how they are behaving and determines the state of a thread lower than rotator thread 122 in hierarchy 142.

In an embodiment, a session producer thread (e.g., rotator thread 122) determines whether a consumer thread (e.g., scheduler thread 124) that is one level below the session producer thread in hierarchy 142 has published the session producer thread's most recently published session. In FIG. 6E, rotator thread 122's pointer references session 654, and rotator thread 122's most recently published session is session 654. Scheduler thread 124 has not yet published session 654. In an example, rotator thread 122 reads the pointer managed by scheduler thread 124 and determines whether the pointer references the session that rotator thread 122 most recently published. In such an example, rotator thread 122 may compare the memory addresses referenced by the rotator thread 122's pointer and scheduler thread 124's pointer and determine whether they match.

In an example, in response to determining that the consumer thread has not published the session producer thread's most recently published session, the session producer thread waits a period of time before attempting to push down the new session into hierarchy 142 for processing. In such an example, rotator thread 122 does not publish new session 656 if the previous session published by rotator thread 122 (e.g., session 654) has not yet been published by scheduler thread 124. In this way, the system automatically throttles itself and may ensure that all sessions are processed and that no sessions are leaked.

In another example, in response to determining that the consumer thread has not published the session producer thread's most recently published session, the session producer thread destroys its most recently published session (e.g., session 654) and replaces it with new session 656. In such an example, rotator thread 122 synchronizes with scheduler thread 124 using a lock on scheduler thread 124's pointer, because this behavior is an exception that breaks the flow of the waterfall by destroying a session after it has been produced, as it is flowing to another level of the waterfall. When scheduler thread 124 decides to process a session, scheduler thread 124 locks its pointer before it reads the rotator thread's session pointer and copies it onto the scheduler thread's session pointer. Scheduler thread 124 then processes the session. In this example, the secondary initialization may be moved to the rotator thread so that the scheduler thread's critical lock section stays small. The secondary initialization may also stay, and force the rotator thread to stall longer in case of lock contention. This is not an issue in this case as the rotator thread is not in the critical code path.

In another example, the same activity can be performed by having the scheduler thread own two pointers, a scheduler_consumer session pointer used to synchronize work between rotator thread 122 and scheduler thread 124, and a scheduler_producer session pointer used to synchronize scheduler thread 124 with worker threads 126A-126C. In that case the rotator thread may publish a new session using a lock only on the scheduler_consumer pointer to prevent the scheduler thread from updating it. In an example, the scheduler thread only uses the scheduler_consumer session pointer to indicate it will consume the session. The scheduler thread's session grabs the lock when the scheduler thread updates the scheduler_consumer pointer as no other thread is allowed to update it.

In yet another example, a lockless variant may be implemented, but may implement a more complex manipulation of the pointers. For example, the rotator thread can publish two session pointers, by adding one for sessions to destroy by the scheduler thread. Before updating the session pointer the rotator thread checks if the destroy session pointer is null. If the session pointer is null, the rotator thread moves its session pointer 132 to the session destroy pointer and copies the new session into the rotator thread's session pointer 132. If the session pointer is not null, the rotator thread destroys the new session without committing it to the waterfall. When the scheduler thread wakes up it grabs the rotator thread session pointer 132 and sets it into its scheduler session pointer 134. If the destroy session pointer is not NULL, the scheduler thread then frees the session if the scheduler thread has not yet used the session, and clears the destroy pointer.

In an embodiment, it may be unnecessary to manage two pointers per thread because of the activities performed by the threads. In such an embodiment, scheduler thread 124 may have a lock on its pointer, and rotator thread 122 may grab scheduler thread 124's lock and verify that scheduler thread 124's pointer does not change while rotator thread 122 updates the pointer. When this is done, rotator thread 122 has swapped its session pointer and can free the unused pointer. In another embodiment, each thread may manage two pointers. For example, if scheduler thread 124 makes changes to the session, it may be advantageous for scheduler thread 124 to maintain two pointers, one pointer for the active session (the scheduler's consumer thread pointer) and one pointer for the published session (the scheduler's producer pointer).

B. Multiple Threads Executing at a Layer of the Pipeline

Additionally, a layer of the pipeline may be multi-threaded. For example, multiple worker threads may be defined at one layer of the pipeline and may process session data 144 concurrently. A first worker thread and a second worker thread run concurrently when execution of the first and second worker threads has some overlap. The multiple worker threads may run concurrently on a single or multiple central processing units (CPUs). In an example, the first worker thread may run on a first processor during a period of time in which a second worker thread is running on a second processor. In another example, the first worker thread may start running on a processor and stop before completion, the second worker thread may start running on the processor and stop before completion, and the first worker thread may resume running on the processor and finish. In another example, the first worker thread may start running on a processor and stop before completion, the second worker thread may start running on the processor and finish, and the first worker thread may resume running on the processor and finish.

In an embodiment, in response to scheduler thread 124 identifying a newly created session by the rotator thread 122, scheduler thread 124 determines whether or not to process it right away by verifying if cleaner thread 128's pointer references the same session as scheduler thread 124. In response to determining that cleaner thread 128's pointer references the same session as scheduler thread 124's pointer, scheduler thread 124 may start to process the newly created session. In such an example, rather than look to the state of all the worker threads, scheduler thread 124 may look to the state of cleaner thread 128 to determine whether to process the newly created session. When scheduler thread 124 awakens, it may wake up the worker threads. When the worker threads start to process a session, the worker threads may update their pointers to reference the session that is referenced by scheduler thread 124's pointer.

Additionally, in response to determining that none of the worker threads are still processing data from older sessions, cleaner thread 128 may close the older session and update its pointer to reference the same session as scheduler thread 124. In such an embodiment, the worker threads' states in the session switch may be side-stepped by scheduler thread 124 looking below at cleaner thread 128's state.

As discussed above and further emphasized here, FIGS. 1-4 and 6A-6E are merely examples, which should not unduly limit the scope of the claims. For example, although the plurality of threads is illustrated as referencing a null value, this is not intended to be limiting. In another example, the pointers managed by the plurality of threads may be initialized to reference a value different from null. As long as the consumer thread below the producer thread knows the value that the producer thread's pointer is initialized to, the consumer thread may determine whether it can start processing the session. Additionally, a consumer thread may determine whether a producer thread's pointer falls within a range of memory addresses rather than determining whether the producer thread's pointer matches the consumer thread's pointer. For example, the consumer thread may be aware that session 140 is stored at a particular set of memory addresses and determine that if the producer thread's pointer references a memory address that falls within the particular set of memory addresses, the consumer thread may start to process the session.

V. Example Computing System

Figure 7:
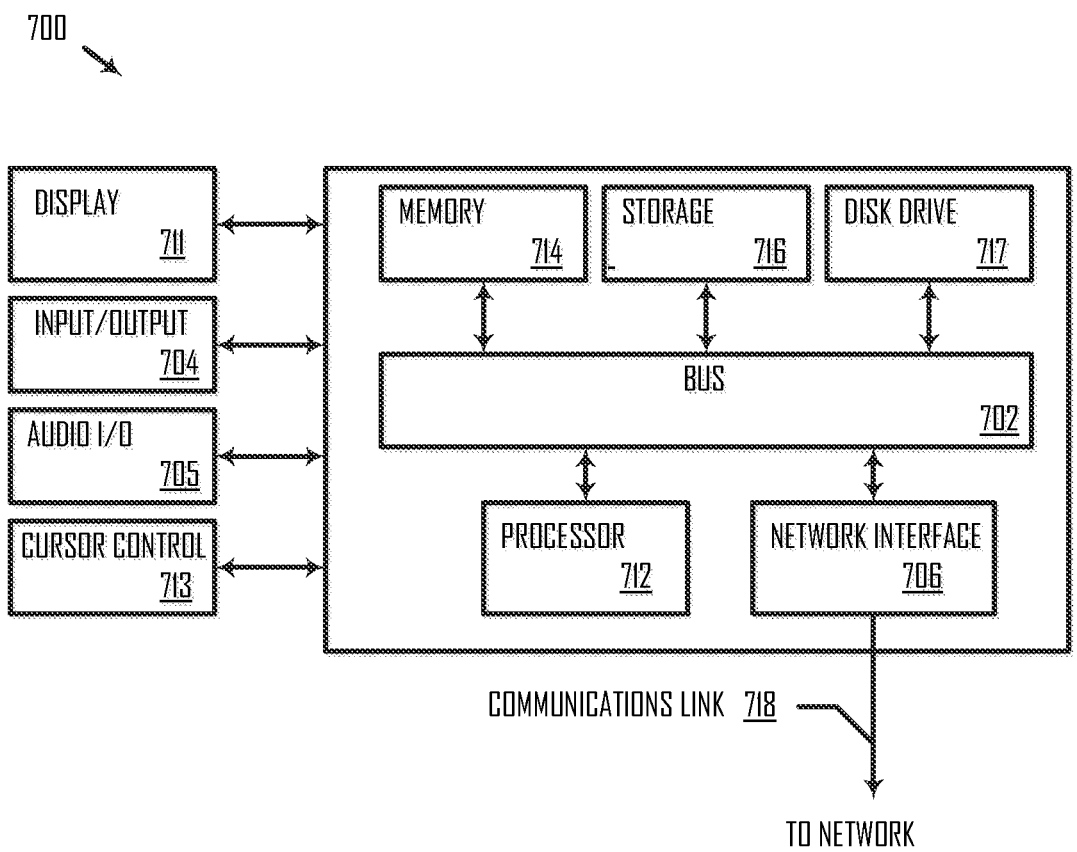
FIG. 7 is a block diagram of an electronic system suitable for implementing one or more embodiments of the present disclosure.

FIG. 7 is a block diagram of a computer system 700 suitable for implementing one or more embodiments of the present disclosure. In various implementations, computing device 102 may include a client or a server computing device that includes one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component such as a display 711, and an input control such as a cursor control 713 (such as a keyboard, keypad, mouse, etc.).

An optional audio input/output component 705 may also be included to allow a user to use voice for inputting information by converting audio signals into information signals. Audio I/O component 705 may allow the user to hear audio. A transceiver or network interface 706 transmits and receives signals between computer system 700 and other devices via a communication link 718 to a network. In an embodiment, the transmission is wireless, although other transmission mediums and methods may also be suitable. Processor 710, which may be a micro-controller, digital signal processor (DSP), or other processing component, processes these various signals, such as for display on display 711 coupled to computer system 700 or transmission to other devices via communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 710 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 714, and transmission media includes coaxial cables, copper wire, and fiber optics, including wires that include bus 702. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., methods 200, 300, 400, and 500) to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Moreover, computing device 102 may be coupled over a network (e.g., via NIC 116). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into subcomponents including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various blocks or actions described herein may be changed, combined into composite blocks or actions, and/or separated into sub-blocks or sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of communicating state information of a session between a plurality of processing threads, wherein the plurality of processing threads includes actions performed by one or more computer processors while executing computer code, comprising:

reading a first pointer of a first processing thread;
comparing the first pointer of the first processing thread to a second pointer of a second processing thread, the second processing thread being dependent on the first processing thread;
in response to determining that the first pointer of the first processing thread does not match the second pointer of the second processing thread, processing a set of configuration items in a session; and
after processing the set of configuration items in the session, updating the second pointer of the second processing thread to match the first pointer of the first processing thread;
wherein when the first pointer is determined to not match the second pointer, the first pointer references the session, and wherein during a first time period the first processing thread processes a second set of configuration items upon which the second processing threads depends.

2. The method of claim 1, wherein the processing a set of configuration items includes during a second time period subsequent to the first time period, processing the first set of configuration items in the session.

3. The method of claim 2, wherein the first processing thread processes a set of fields in the session, and the second processing thread consumes the set of fields in the session, and wherein the first and second processing threads do not lock the set of fields in the session.

4. The method of claim 1, wherein the reading includes reading, via the second processing thread, the first pointer of the first processing thread, wherein the comparing includes comparing, via the second processing thread, the first pointer to the second pointer, wherein the processing includes processing, via the second processing thread, the set of configuration items, and wherein the updating includes updating, via the second processing thread, the second pointer to match the first pointer.

5. The method of claim 1, further including:
reading, via a third processing thread, the first pointer of the first processing thread, the third processing thread being dependent on the first processing thread;
comparing, via the third processing thread, the first pointer to a third pointer of the third processing thread;
in response to determining that the first pointer does not match the third pointer, processing the set of configuration items in the session; and
after processing the set of configuration items in the session, updating the third pointer of the third processing thread to match the first pointer of the first processing thread.

6. The method of claim 5, wherein the second and third processing threads are worker threads, and each of the second and third processing threads is designated a memory buffer, the method further including:
obtaining results based on processing the set of configuration items;
writing the results to a designated memory buffer.

7. The method of claim 6, further including:
determining, via a fourth processing thread, whether to write data stored in one or more memory buffers to disk;
in response to determining to write data stored in a memory buffer to disk, writing data stored in the memory buffer to disk; and
closing the session.

8. The method of claim 7, further including:
determining whether the second and third processing threads are processing a common session; and
in response to determining that the second and third processing threads are processing the same session, publishing, via a fourth processing thread, the common session.

9. The method of claim 1, further including:
reading, via a third processing thread, the second pointer of the second processing thread, the third processing thread being dependent on the second processing thread;
comparing, via the third processing thread, the second pointer of the second processing thread to a third pointer of the third processing thread;
in response to determining that the second pointer does not match the third pointer, processing a second set of configuration items in the session; and
after processing the second set of configuration items, updating the third pointer of the third processing thread to match the second pointer of the second processing thread.

10. The method of claim 1, wherein the first pointer is a volatile pointer that is shared between the first and second processing threads, and the first processing thread exposes the volatile pointer to one or more processing threads that is dependent on the first processing thread.

11. A system, comprising:
a memory comprising a machine readable medium having stored thereon machine executable code; and a processor module coupled to the memory that executes the machine executable code for communicating state information of a session between a plurality of processing threads,
wherein a first processing thread manages a first global pointer and publishes one or more sessions; and a second processing thread manages a second global pointer, reads the first global pointer, and determines whether the first global pointer references a session that is not referenced by the second global pointer, wherein the second processing thread is dependent on the first processing thread, wherein in response to determining that the first global pointer references a session that is not referenced by the second global pointer, the second processing thread processes a set of configuration items, and wherein after the set of configuration items is published, the second processing thread publishes the session that is referenced by the first processing thread.

12. The system of claim 11, wherein the first global pointer is a volatile pointer that is shared between the first and second processing threads.

13. The system of claim 12, wherein when the second processing thread publishes the session that is referenced by the first processing thread, the second processing thread sets the volatile pointer that is shared between the first and second processing threads to the session that is referenced by the first processing thread.

14. The system of claim 11, wherein when the second processing thread publishes the session that is referenced by the first processing thread, the second processing thread updates the second global pointer of the second processing thread to match the first global pointer of the first processing thread.

15. The system of claim 11, wherein the second global pointer is a volatile pointer that is shared between the second processing thread and a third processing thread, and wherein the third processing thread is dependent on the second processing thread.

16. The system of claim 11, wherein the first processing thread creates the first session that is referenced by the first processing thread and determines whether to create a second session, wherein when the first processing thread determines whether to create the second session the first processing thread identifies the first processing thread's most recently published session, reads the second global pointer of the second processing thread, and determines whether the second global pointer references the first processing thread's most recently published session.

17. The system of claim 16, wherein in response to determining that the second global pointer references the first processing thread's most recently published session, the first processing thread creates the second session, processes the second session and publishes the second session.

18. The system of claim 16, wherein in response to determining that the second global pointer does not reference the first processing thread's most recently published session, the first processing thread waits a time period before determining whether to create the second session.

19. A non-transitory, machine-readable medium comprising a plurality of machine-readable instructions that when executed by one or more processors is adapted to cause the one or more processors to perform a method comprising:

reading a first pointer of a first processing thread;

determining whether the first pointer of the first processing thread and a second pointer of a second processing thread reference a common session, the second processing thread being dependent on the first processing thread;

in response to determining that the first pointer of the first processing thread and the second pointer of the second processing thread do not reference the common session, processing a set of configuration items in a session; and after processing the set of configuration items, updating the second pointer of the second processing thread to reference the common session;

wherein when the first pointer is determined to not match the second pointer, the first pointer references the session, and wherein during a first time period the first processing thread processes a second set of configuration items upon which the second processing threads depends.

20. The non-transitory, machine-readable medium of claim 19, wherein the first processing thread processes a set of fields in the session, and the second processing thread consumes the set of fields in the session, and wherein the first and second processing threads do not lock the set of fields in the session.

* * * * *